US012000517B2

(12) United States Patent
Greer, Jr.

(10) Patent No.: US 12,000,517 B2
(45) Date of Patent: Jun. 4, 2024

(54) SAFE SERVICE FITTING

(71) Applicant: Texas Real Energy Solutions, LLC, Corinth, TX (US)

(72) Inventor: Roderick Lee Greer, Jr., Fort Worth, TX (US)

(*) Notice: Subject to any disclaimer, the term of this patent is extended or adjusted under 35 U.S.C. 154(b) by 0 days.

(21) Appl. No.: 18/154,988

(22) Filed: Jan. 16, 2023

(65) Prior Publication Data

US 2023/0235843 A1   Jul. 27, 2023

Related U.S. Application Data

(60) Provisional application No. 63/303,741, filed on Jan. 27, 2022.

(51) Int. Cl.
| *F16L 41/16* | (2006.01) |
| *F16K 27/06* | (2006.01) |
| *F16L 41/04* | (2006.01) |
| *F16L 41/08* | (2006.01) |

(52) U.S. Cl.
CPC .......... *F16L 41/16* (2013.01); *F16K 27/067* (2013.01); *F16L 41/04* (2013.01); *F16L 41/084* (2013.01); *Y10T 137/7036* (2015.04); *Y10T 137/7043* (2015.04); *Y10T 137/7062* (2015.04); *Y10T 137/7065* (2015.04)

(58) Field of Classification Search
CPC ......... Y10T 137/7043; Y10T 137/7062; Y10T 137/7065; Y10T 137/7036; F16L 41/16; F16L 41/04; F16L 41/084; F16K 27/067
See application file for complete search history.

(56) References Cited

U.S. PATENT DOCUMENTS

| 1,357,463 A | * | 11/1920 | Mccarthy | F16K 35/10 137/382 |
| 1,814,134 A | * | 7/1931 | Eige | F16L 59/16 138/140 |
| 2,041,911 A | * | 5/1936 | Ericson | F16L 59/12 138/148 |
| 2,054,340 A | * | 9/1936 | Philip | F16K 7/126 251/331 |

(Continued)

OTHER PUBLICATIONS

Patent Cooperation Treaty, International Search Report and the Written Opinion of the International Searching Authority, dated May 25, 2023.

*Primary Examiner* — Daphne M Barry
*Assistant Examiner* — Frederick D Soski
(74) *Attorney, Agent, or Firm* — CIONCA IP Law P.C.

(57) ABSTRACT

A pipe fitting having a base configured to engage with a pipe, the base having a mounting seat configured to engage directly with the pipe, a base ring configured to engage with the mounting seat, and a base flange configured to engage with the base ring, a top hat configured to engage with the base, the top hat having a top cap, a top hat ring configured to engage with the top cap, and a top hat flange configured to engage with the top hat ring, wherein the top hat flange is further configured to engage with the base flange to form a fitting cavity. A pipe flow controller may be in fluid communication with the internal pipe volume through a threaded nipple, while also being securely housed within the fitting cavity, thus protecting the pipe flow controller from corrosion, impacts and other forms of damage to prevent leakage.

20 Claims, 27 Drawing Sheets

(56) References Cited

U.S. PATENT DOCUMENTS

| | | | | |
|---|---|---|---|---|
| 2,206,707 A * | 7/1940 | Shaw | F16K 35/10 | 137/382 |
| 2,578,628 A * | 12/1951 | Hartman | F16K 1/32 | 137/382 |
| 2,578,629 A * | 12/1951 | Hartman | F16K 1/32 | 137/382 |
| 2,578,630 A * | 12/1951 | Hartman | F16K 27/08 | 74/89.41 |
| 2,601,840 A * | 7/1952 | Smith | F16L 23/167 | 436/100 |
| 2,708,896 A * | 5/1955 | Smith | F16L 59/168 | 436/100 |
| 2,954,797 A * | 10/1960 | Dryer | G01M 3/02 | 251/293 |
| 3,044,915 A * | 7/1962 | Jacobsen | F16L 59/161 | 137/375 |
| 3,857,546 A * | 12/1974 | Quirk | F16K 5/0689 | 251/315.15 |
| 3,863,668 A * | 2/1975 | Waters | F16K 27/00 | 285/55 |
| 3,871,400 A * | 3/1975 | Thastrup | F16K 27/006 | 137/363 |
| 3,901,268 A | 8/1975 | Mullins | | |
| 3,901,269 A * | 8/1975 | Henderson | F16L 53/32 | 165/47 |
| 4,040,440 A * | 8/1977 | Zaki | F16K 47/02 | 251/61.4 |
| 4,046,406 A * | 9/1977 | Press | F16L 59/161 | 285/55 |
| 4,155,372 A | 5/1979 | Mills | | |
| 4,161,187 A * | 7/1979 | Bauer | F16K 27/0272 | 29/447 |
| 4,207,918 A * | 6/1980 | Burns | F16L 59/168 | 150/156 |
| 4,259,981 A * | 4/1981 | Busse | F16L 59/161 | 285/47 |
| 4,311,166 A * | 1/1982 | De Feo | F16K 49/00 | 251/305 |
| 4,319,737 A * | 3/1982 | Waterfield | F16K 43/00 | 251/331 |
| 4,350,052 A | 9/1982 | Kendall | | |
| 4,556,082 A * | 12/1985 | Riley | F16L 59/168 | 150/156 |
| 4,696,324 A * | 9/1987 | Petronko | F16L 59/161 | 285/47 |
| 4,776,362 A * | 10/1988 | Domingue, Sr. | E03B 7/10 | 137/59 |
| 4,848,396 A * | 7/1989 | Sisk | B65G 53/52 | 285/133.11 |
| 4,865,220 A * | 9/1989 | Wiegand | B65D 90/10 | 220/661 |
| 4,921,004 A * | 5/1990 | Lane | F16L 41/06 | 138/30 |
| 5,119,844 A * | 6/1992 | Cannon | F17C 13/002 | 137/355.16 |
| 5,241,981 A * | 9/1993 | Ahern | F16K 27/02 | 137/543.17 |
| 5,374,085 A * | 12/1994 | Beatrice | F16L 37/10 | 285/86 |
| 5,505,226 A * | 4/1996 | Breth | F16K 49/00 | 251/291 |
| 5,947,151 A * | 9/1999 | Shafer | F17D 5/04 | 251/367 |
| 6,123,098 A * | 9/2000 | Gremillion, III | F16K 35/10 | 220/4.24 |
| 9,039,046 B2 * | 5/2015 | Beagen, Jr. | F16L 17/025 | 285/367 |
| 9,168,585 B2 * | 10/2015 | Schell | F16L 21/06 | |
| 9,194,516 B2 * | 11/2015 | Beagen, Jr. | F16L 21/065 | |
| 2004/0025939 A1 * | 2/2004 | Woessner | F42B 10/663 | 137/375 |
| 2004/0226610 A1 * | 11/2004 | McEnerney | F16K 35/06 | 137/382 |
| 2011/0049410 A1 * | 3/2011 | Golecki | F16K 27/06 | 29/890.132 |
| 2014/0069524 A1 * | 3/2014 | Faulkenberry | F16K 27/00 | 137/377 |
| 2014/0116536 A1 * | 5/2014 | Resendiz | F16K 35/10 | 137/377 |
| 2014/0196792 A1 * | 7/2014 | Torres-Leon | A61M 39/223 | 137/1 |
| 2017/0268684 A1 * | 9/2017 | Gross | F16K 15/00 | |
| 2018/0003316 A1 * | 1/2018 | Lee | E21F 17/00 | |
| 2021/0254772 A1 | 8/2021 | Kaneta et al. | | |
| 2023/0235843 A1 * | 7/2023 | Greer, Jr. | F16L 41/06 | 137/15.12 |

* cited by examiner

SAFE SERVICE FITTING

CROSS-REFERENCE TO RELATED APPLICATIONS

This application claims the benefit of U.S. Provisional Application No. 63/303,741, filed Jan. 27, 2022, which is hereby incorporated by reference, to the extent that it is not conflicting with the present application.

BACKGROUND OF INVENTION

1. Field of the Invention

The invention relates generally to pipe fittings and specifically to pipe fittings configured to secure and protect pipe flow controllers.

2. Description of the Related Art

The need to safely and efficiently transport materials through pipelines has always posed a variety of unique challenges in each applicable industry. While the utilization of connectors, controllers, adapters, etc., configured to engage with the pipe may provide additional functionalities, such as selectively controlling the flow of a fluid through a pipe, said structures may also introduce additional complexity into the corresponding pipe system, thus providing additional potential failure sites that may cause leaking or rupture within the corresponding pipe system. The connectors, controllers, and adapters may be particularly vulnerable to impacts from heavy machinery, which may cause the contents of the pipe to leak out and/or materials from the environment to leak into the pipe upon it being damaged. Furthermore, additional hazards introduced by environmental aspects, such as corrosion, and other forms of damage that may occur from pipe elements being exposed to dirt or other contaminants, may be difficult to avoid in applications that require that the pipeline to be buried underground or submerged under water. Many existing fittings configured to facilitate engagement between the pipes and connectors, controllers, or adapters do not provide sufficient protection to each element, thus leaving the connectors, controllers, or adapters vulnerable to damage from corrosion, impact or even damage during installation (e.g., being hit by welding sparks.)

Therefore, there is a need to solve the problems described above by proving a device and method for providing a pipe fitting configured to securely engage with a pipe to prevent wear and damage to an attached pipe flow controller.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, a pipe fitting configured to engage with a pipe having a pipe port is provided, the pipe fitting comprising: a base having: a mounting seat having a base hole, the mounting seat being configured to engage directly with the pipe such that the base hole is coaxially aligned with the pipe port; a base ring configured to engage with the mounting seat; and a base flange configured to engage with the base ring, wherein the base flange is comprised of a base ring slot, wherein the base ring is configured to be partially nested within the base ring slot; a top hat configured to engage with the base, the top hat having: a top cap having a cap ring slot; a top hat ring configured to be partially nested within the cap ring slot; and a top hat flange having a top flange ring slot, wherein the top hat ring is further configured to be partially nested within the top flange ring slot, wherein the top hat flange is configured to be reversibly engaged with the base flange to create a fitting cavity; and a threaded nipple configured to be nested within the base hole, wherein the threaded nipple is further configured to engage with a pipe flow controller, such that the pipe flow controller is in fluid communication with an inner volume of the pipe and the base flange and top hat flange are configured to protrude outward away from the fitting cavity, such that the base flange and top hat flange are configured to protect structures within the fitting cavity. Thus an advantage is that the pipe fitting may form protective barrier around a pipe flow controller, thus preventing it from being damaged or corroded. The base flange and top hat flange are configured to form a protective ring around the pipe fitting, thus allowing the base flange and top hat flange to direct impacts away from the internally held pipe flow controller and other elements enclosed within the fitting cavity. Another advantage is that the pipe fitting allows the flow control element to remain attached to the pipe permanently, even when not in use, thus allowing it to be accessed later for easy manipulation of pipe flow. The pipe having this pipe fitting may also be buried or submerged as a result of the pipe fitting surrounding and protecting the pipe flow controller from the surrounding environment.

In another aspect, a pipe fitting configured to engage with a pipe is provided, the pipe fitting comprising: a base configured to engage with the pipe, the base having: a mounting seat configured to engage directly with the pipe; a base ring configured to engage with the mounting seat, the base ring having a first outer diameter; a base flange configured to engage with the base ring, the base flange having a second outer diameter; a top hat configured to selectively engage with the base, the top hat having: a top hat flange configured to engage directly with the base flange, the top hat flange having a third outer diameter; a top hat ring configured to engage with the top hat flange, the top hat ring having a fourth outer diameter; a top cap configured to engage with the top hat ring, the top cap having a fifth outer diameter; a bleed off port nested within the top cap; and a bleed off screw configured to selectively nest within the bleed off port; wherein the second and third outer diameters are each greater than the fifth outer diameter, and the first and fourth outer diameters are each less than the fifth outer diameter and wherein upon engagement of the top hat with the base a fitting cavity is formed; wherein the pipe fitting is configured to surround and protect the pipe flow controller such that the pipe flow controlled is disposed within the fitting cavity and the pipe flow controller is in fluid communication with an internal volume of the pipe. Again, an advantage is that the pipe fitting may form protective barrier around the pipe flow controller, thus preventing it from being damaged or corroded. The base flange and top hat flange are configured to form a protective ring around the pipe fitting, thus allowing the base flange and top hat flange to direct impacts away from the internally held pipe flow controller and other elements enclosed within the fitting cavity. Another advantage is that the pipe fitting allows the flow control element to remain attached to the pipe permanently, even when not in use, thus allowing it to be accessed later for easy manipulation of pipe flow. The pipe having this pipe fitting may also be buried or submerged as a result of the pipe fitting surrounding and protecting the pipe flow controller from the surrounding environment.

In another aspect, a method for installing a pipe fitting on a pipe is provided, the method comprising the steps of: engaging a base of the pipe fitting with the pipe, the base comprising: a mounting seat having a base hole, the mounting seat being configured to engage directly with the pipe; a base ring configured to engage with the mounting seat; a base flange configured to engage with the base ring; and a threaded nipple configured to be seated within the base hole and engaged with the mounting seat, such that base hole and threaded nipple are coaxially aligned; tapping the pipe by drilling a pipe port into the pipe, wherein the pipe port is coaxially aligned with the base hole, such that threaded nipple is in fluid communication with an internal volume of the pipe; engaging a pipe flow controller with the threaded nipple; engaging a bull plug with the pipe flow controller; and engaging a top hat with the base in order to form a fitting cavity around the pipe flow controller, the top hat comprising: a top hat flange configured to engage directly with the base flange; a top hat ring configured to engage with the top hat flange; and a top cap configured to engage with the top hat ring. Again, an advantage is that the pipe fitting may form protective barrier around the pipe flow controller, thus preventing it from being damaged or corroded. The base flange and top hat flange are configured to form a protective ring around the pipe fitting, thus allowing the base flange and top hat flange to direct impacts away from the internally held pipe flow controller and other elements enclosed within the fitting cavity. Another advantage is that the pipe fitting allows the flow control element to remain attached to the pipe permanently, even when not in use, thus allowing it to be accessed later for easy manipulation of pipe flow. The pipe having this pipe fitting may also be buried or submerged as a result of the pipe fitting surrounding and protecting the pipe flow controller from the surrounding environment.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which.

DETAILED DESCRIPTION

Figures 1A, 1B:
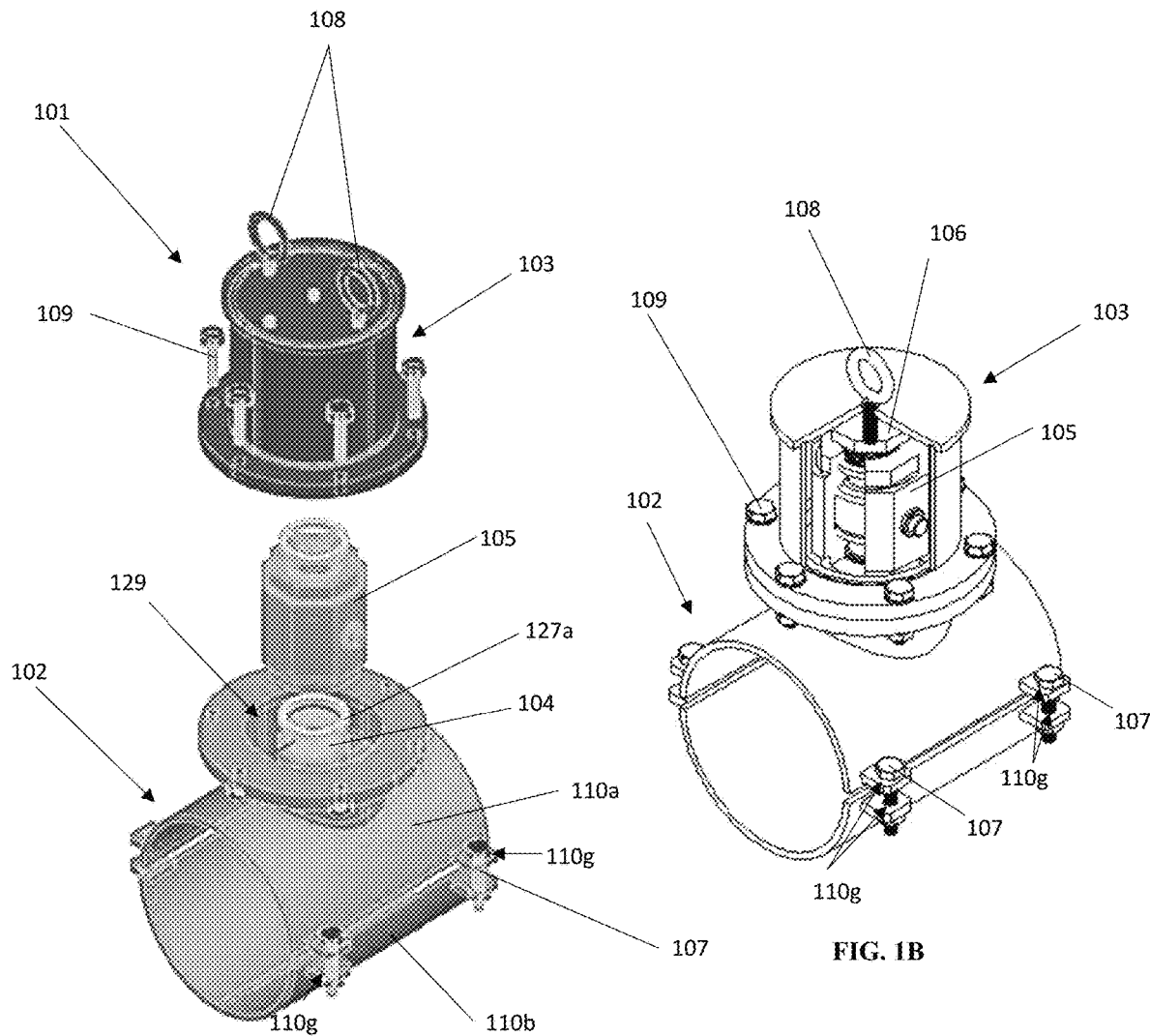
FIG. 1A illustrates the exploded view of an embodiment of a safe service fitting, according to an aspect.
FIG. 1B illustrates the partial sectional view of an embodiment of a safe service fitting, according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

For the following description, it can be assumed that most correspondingly labeled elements across the figures (e.g., 102 and 202, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

FIG. 1A illustrates the exploded view of an embodiment of a safe service fitting 101, according to an aspect. FIG. 1B illustrates the partial sectional view of an embodiment of a safe service fitting 101, according to an aspect. A safe service fitting ("service fitting", "pipe fitting", "fitting") may be an equalization and blow down fitting for use on a pipe/pipeline, wherein the safe service fitting 101 is configured to protect the job site through various mechanisms, as will be described hereinbelow. The safe service fitting 101 may be comprised of several parts configured to interlock or otherwise engage with each other to provide the required protection to internally disposed functional elements, such a full port ball valve 105.

Figure 12:
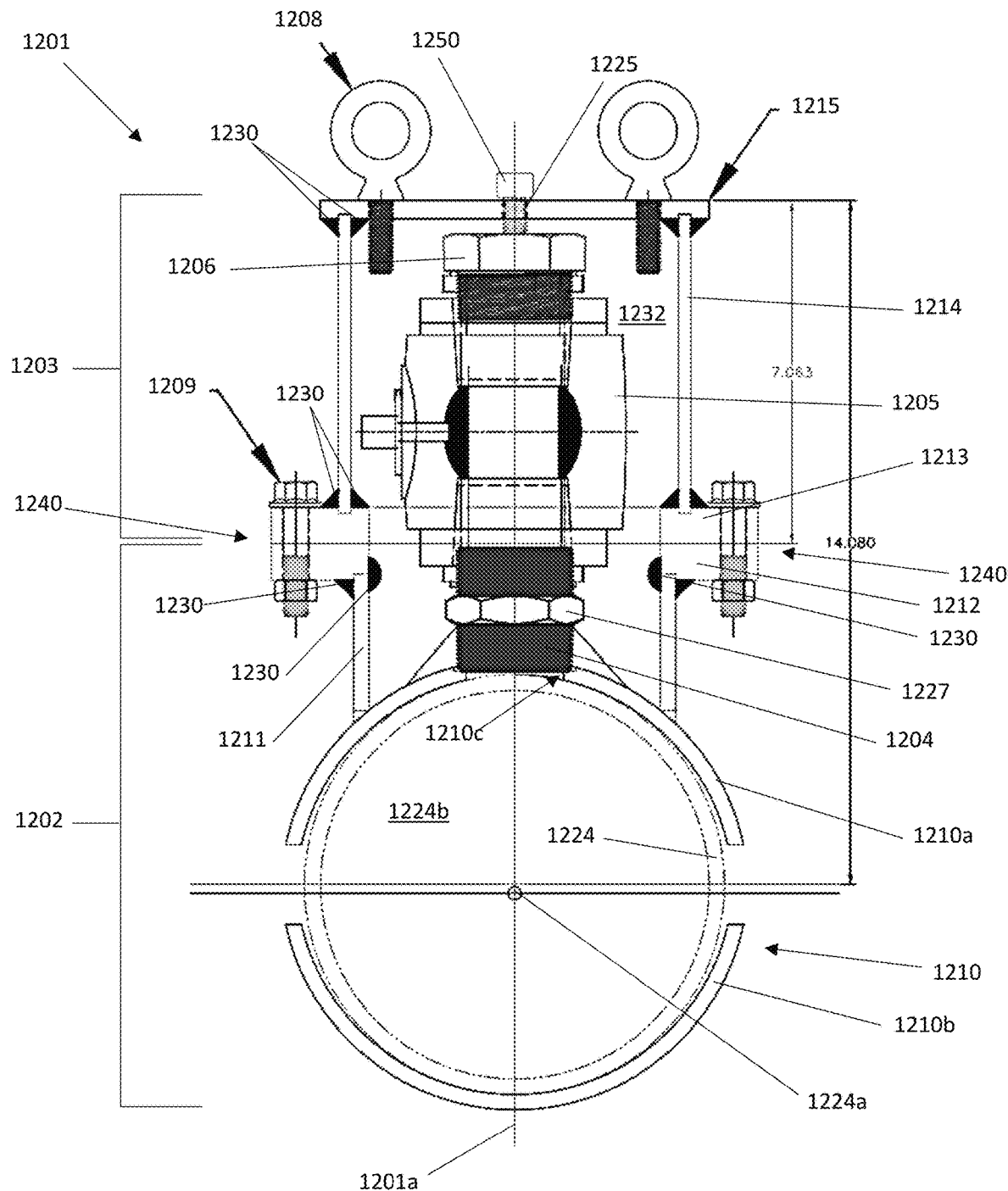
FIG. 12 illustrates the side cross-sectional view of an embodiment of a safe service fitting engaged with a pipe, according to an aspect.

The safe service fitting 101 may be comprised of a base 102 configured to engage directly with a pipe, such as pipe 1224 of FIG. 12. The base 102 may be configured to engage with the pipeline through the usage of base bolts 107 to clamp an upper mounting seat section 110a and a lower mounting seat section 110b of the base 102 together around a pipe, through direct welding of the base 102 to the pipe, or another suitable engagement method to ensure a secure connection between the pipe and base 102. More specifically, each base bolt 107 may be configured to nest within complementarily positioned base bolt ports 110g nested within the upper mounting seat section 110a and the lower mounting seat section 110b, as seen in FIGS. 1A-1B. It should be understood that the base 102 may be configured to keep welding heat and sparks clear of a service area 129 (the area enclosed within the base 102), as heating the service area up beyond a certain threshold can damage various service area elements, including the threaded nipple 104, and surrounding pipe area, with egging, warping, or other types of heat induced damage. In addition to protecting the threaded nipple 104 from welding heat, the base 102 may be configured to be sufficiently bulky to provide a protective barrier around the structures that it encloses, including the threaded nipple 104. This protective barrier may prevent damage to internally disposed elements which may occur from the operation of heavy machinery and other sources of damage from impact. The base 102 may be configured to engage with the threaded nipple 104 through the nesting of said threaded nipple 104 within/through a base hole, such as base hole 310c of FIG. 3A, and subsequent welding of the threaded nipple 104 in place. The structure of the base 102 will be described in greater detail hereinbelow.

The safe service fitting 101 may be further comprised of a top hat 103 configured to engage directly with the base 102 to provide a protective covering over the service area 129 and the various enclosed structures. The top hat 103 may be configured to not only protect internal structures, such as the threaded nipple 104, a full port ball valve ("ball valve") 105, etc., from heavy machinery during excavating, but the top hat 103 may also be configured to help maintain the longevity of the internal structures by protecting them from corrosion, dirt and chemicals. A plurality of cap ports, such as cap ports 915*c* of FIG. 9A-9B, may be nested within a top cap portion of the top hat 103, such as top cap 915 of FIG. 9A-9B. In an embodiment, two of these cap ports may be used to secure eye bolts 108 to the top hat 103, as seen in FIG. 1A, wherein said eye bolts 108 may be used to easily manipulate the pipe without having to wrap around it.

In another embodiment, a bleed off port, such as bleed off port 1225 of FIG. 12, may be nested within a top cap of the top hat 103, wherein said bleed off port is configured to be used to engage with a bleed off screw and to be used to check the pipe for a potential bleed pathway within the safe service fitting 101. A bleed off screw, such as bleed off screw 1250 of FIG. 12, may be used to selectively seal a fitting cavity, such as fitting cavity 1232 of FIG. 12, of the safe service fitting by nesting within the bleed off port, as will be described hereinbelow. The top hat 103 may be configured to engage with the base 102 through the utilization of top hat bolts 109 configured to be threaded through corresponding portions of the base 102 and top hat 103, such that base 102 and top hat 103 are reversibly engaged with each other. The top hat bolts 109 may be configured to engage with corresponding washers and nuts to ensure a secure engagement between the top hat 103 and base 102. It should be understood that a top hat gasket (not shown) may be configured to nested between the top hat 103 and the base 102 while the base 102 and top hat 103 are engaged with each other, in order to further reinforce the seal between these two elements, as applicable. Said top hat gasket may be configured to be seated within an applicable top hat or base structure, such as a base slot 713*c* of FIG. 7B.

As disclosed hereinabove. The engagement of the top hat 103 with the base 102 is configured to provide a protective structure around internally disposed elements within the safe service fitting 101. These internally disposed elements may include the threaded nipple 104, the full port ball valve 105, and the bull plug 106, as can be seen in FIGS. 1A and 1B. The threaded nipple 104 may be nested within the aforementioned base hole to facilitate access to the attached pipe, thus allowing the threaded nipple 104 to act as a service tap within the pipe. The threaded nipple 104 may be configured to engage with the full port ball valve 105 to facilitate control operations (e.g., stop/starting flow through the attached pipe) for the attached pipe. In an embodiment, a tap O-ring gasket 127*a* may be engaged with ball valve 105 and the threaded nipple 104 to ensure an airtight fit between the threaded nipple 104 and the ball valve 105, as will described in greater detail hereinbelow.

The full port ball valve 105 may be configured to engage with a bull plug 106, wherein the bull plug is configured to be inserted within the top of the full port ball valve 105. The bull plug may be configured to be threaded into a top portion of the ball valve 105 when said ball valve 105 is shut off, in order to further prevent the safe service fitting from leaking. The ball valve 105 may be classified as a type of flow controller, wherein a flow controller is any structure configured to be manipulated to modify the flow of fluid through an attached pipe, such as pipe 1224 of FIG. 12. The utilization of a top hat 103 gives contractors and other workers the option of leaving the ball valve 105 installed in place on the pipe during service operations and general use/manipulation without fear of the flow controller becoming damaged. Unless otherwise stated, each structure of the safe service fitting 101 may be constructed/formed from an appropriately strong and durable material, including metals such as steel or carbon steel, to ensure that the safe service fitting is capable of protecting the elements it conceals from impacts, corrosion, etc.

It should be understood that the following disclosed measurements for each of the structures of the safe service fitting 101 may be suitably adjusted as needed, based upon the pipeline being fitted, general application, etc. and that any measurement provided herein is not intended to limit the potential sizes and specifications of each element. In an embodiment, the safe service fitting may be available for use on pipes having a 2-inch diameter pipes or a 3-inch diameter, wherein each safe service fitting embodiment may have a maximum operation pressure and maximum operation temperature and of at least 2000 psi and at least 180° F. (82° C.), respectively.

Figure 2A:
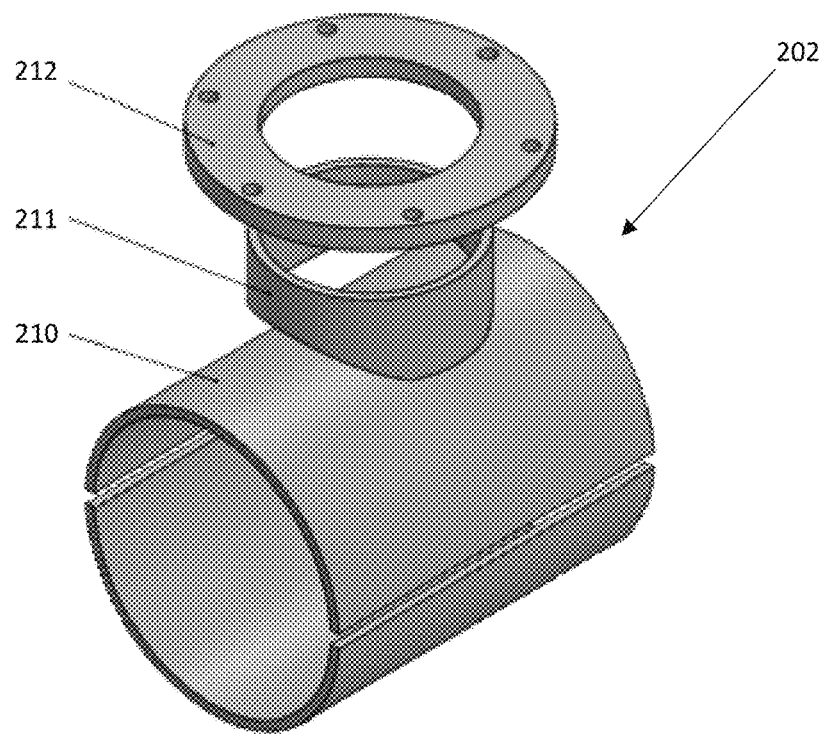
FIG. 2A illustrates the exploded view of an embodiment of a base, according to an aspect.
Figure 2B:
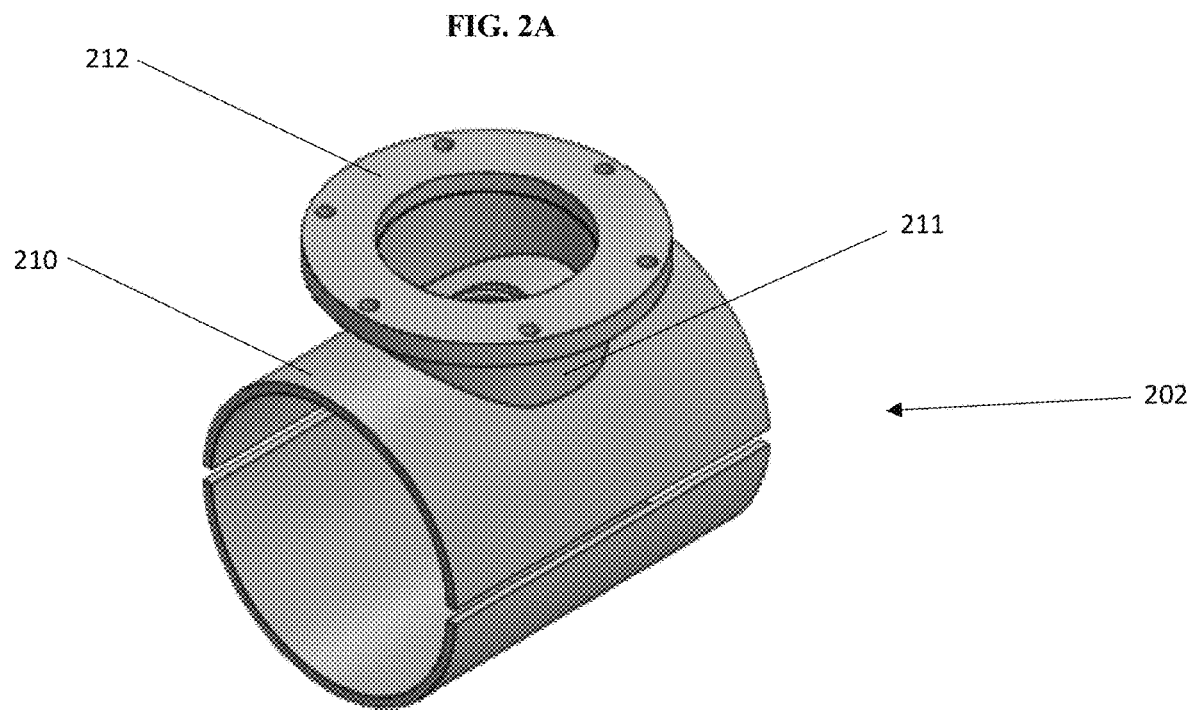
FIG. 2B illustrates the top perspective view of an embodiment of a base, according to an aspect.
Figures 2C, 2D:
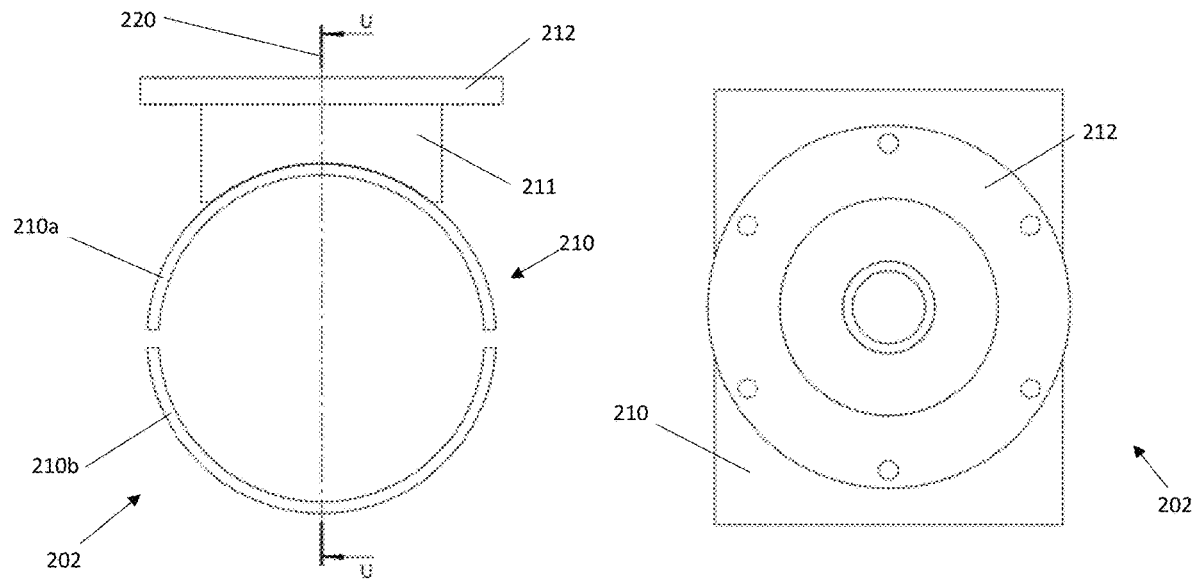
FIG. 2C illustrates the side elevation view of an embodiment of a base having reference plane U-U, according to an aspect.
FIG. 2D illustrates the top plan view of an embodiment of a base, according to an aspect.
Figure 2E:
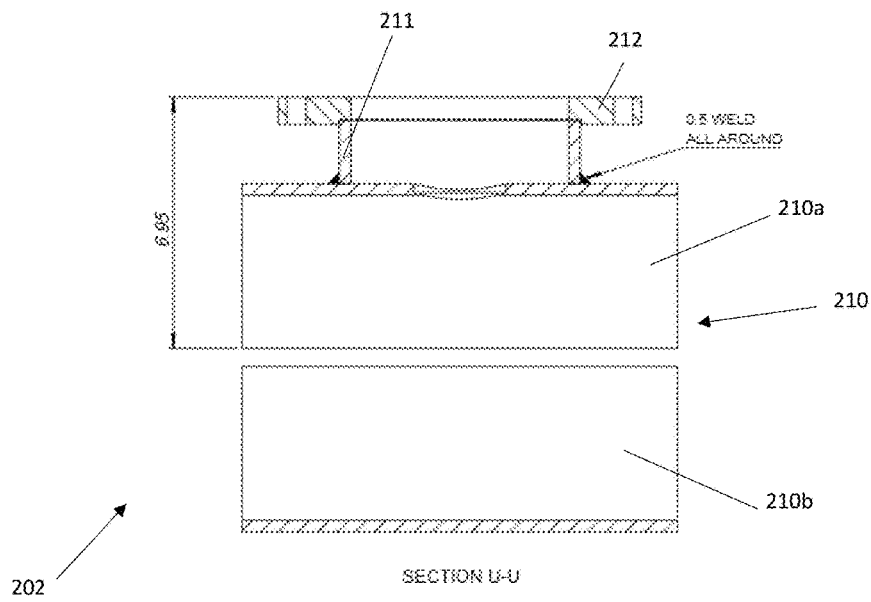
FIG. 2E illustrates the front cross-sectional view of an embodiment of a base along reference plane U-U, according to an aspect.

FIG. 2A illustrates the exploded view of an embodiment of a base 202, according to an aspect. FIG. 2B illustrates the top perspective view of an embodiment of a base 202 having a reference plane U-U 220, according to an aspect. FIG. 2C illustrates the side elevation view of an embodiment of a base 202, according to an aspect. FIG. 2D illustrates the top plan view of an embodiment of a base 202, according to an aspect. FIG. 2E illustrates the front cross-sectional view of an embodiment of a base 202 along reference plane U-U, according to an aspect. The base 202 may be comprised of a plurality of interconnected elements that are configured to work in conjunction with each other to engage said base 202 with both a pipe or pipeline and a top hat. The base 202 may be comprised of a mounting seat 210 configured to be engaged directly to a pipe, a base ring 211 configured to be engage with the mounting seat 210 and a base flange 212 configured to be engaged with the base ring 211 and a corresponding top hat. The mounting seat 210, base ring 211 and base flange 212 will be described in greater detail hereinbelow.

In order to facilitate secure attachment to each other, each of the base elements 210, 211, 212 may be engaged with each other using an appropriate attachment method. In an embodiment, the mounting seat 210 may be configured to engage with the base ring 211 and the base ring 211 may be configured to engage with the base flange 212 through welding. In said embodiment, an approximately half inch weld (~0.5 inch) may be used to secure the base ring 211 to the mounting seat 210. In another embodiment the mounting seat 210, base ring 211 and base flange 212 may be formed as a monolithic structure through casting/die-casting or other suitable known mechanisms. The mounting seat 210, base ring 211 and base flange 212 may be made of a type of metal, such as steel or carbon steel, such that the interconnection of each element by welding is possible in applicable embodiments. The base flange 212 may be configured to further engage with a top hat flange, such as top hat flange 613 of FIG. 6A, to allow the base 202 to be secured to a top hat, such as top hat 603 of FIG. 6A, as will be discussed in greater detail hereinbelow.

The size of the base 202 may be adapted to fit onto and engage with any applicable pipe or pipeline, such that protection of relevant pipe elements (such as pipe flow controllers) is possible. In an embodiment, the distance between a bottom most portion of an upper mounting seat section 210*a* and the upper most portion of a base flange 212 may be about 6.95 inches, as seen in FIG. 2E. As can also be seen in FIG. 2E, the mounting seat 210 may be comprised of an upper mounting seat section 210a and a lower mounting seat section 210b. In an embodiment, the upper mounting seat section 210a and a lower mounting seat section 210b may be configured to be clamped around a pipe (not shown) through engagement with each other using base bolts, such as base bolts 107 of FIG. 1A, as described hereinabove. In an alternative embodiment, the lower mounting seat section 210b may be omitted, and the upper mounting seat section 210a may be welded directly onto the pipe, to secure the base 202 to said pipe. In an embodiment, the base 202 may be configured to engage with a pipe having a diameter ranging from 2 inches to 36 inches.

Figure 3A:
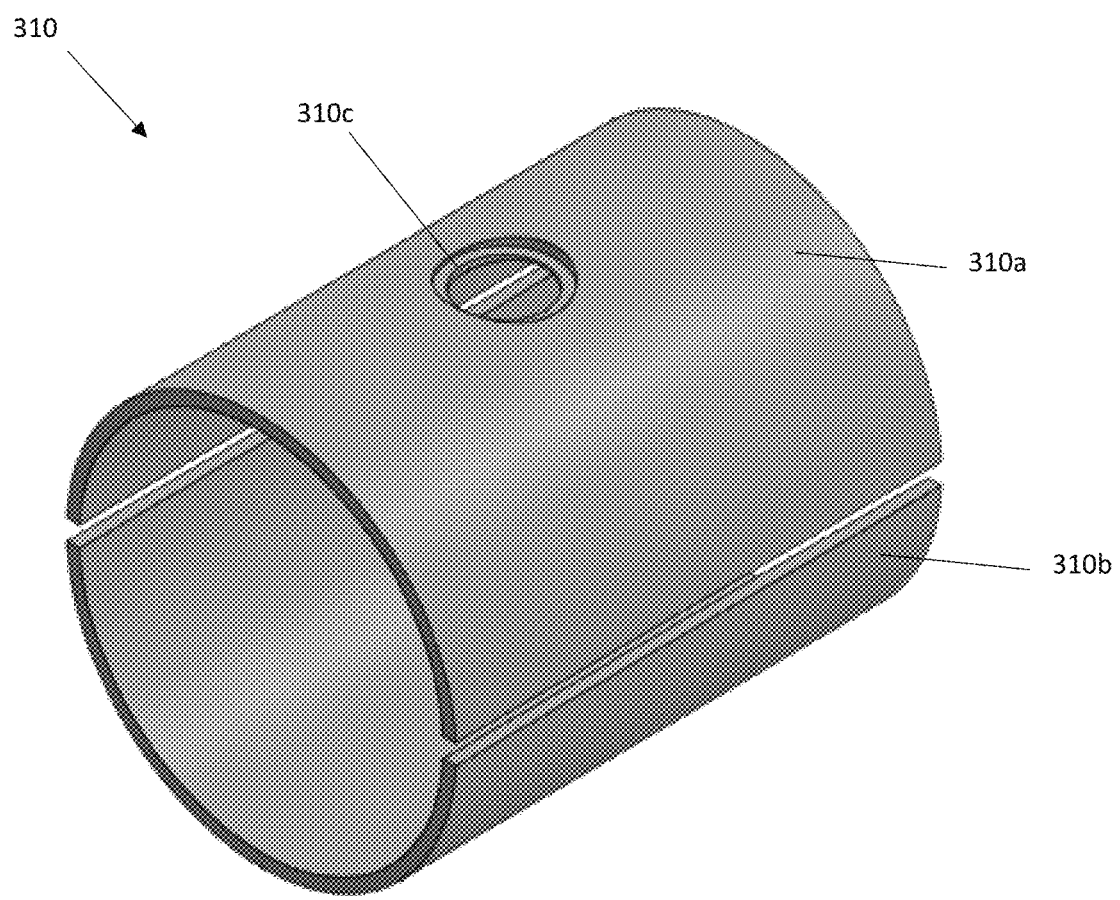
FIG. 3A illustrates the top perspective view of an embodiment of a mounting seat, according to an aspect.
Figure 3B:
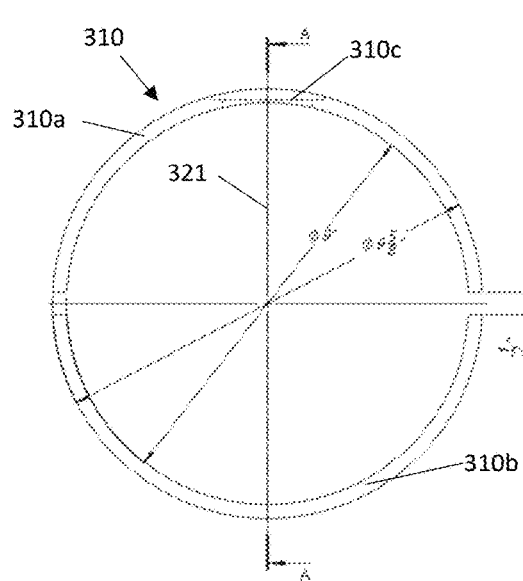
FIG. 3B illustrates the side elevation view of an embodiment of a mounting seat having reference plane A-A, according to an aspect.
Figure 3C:
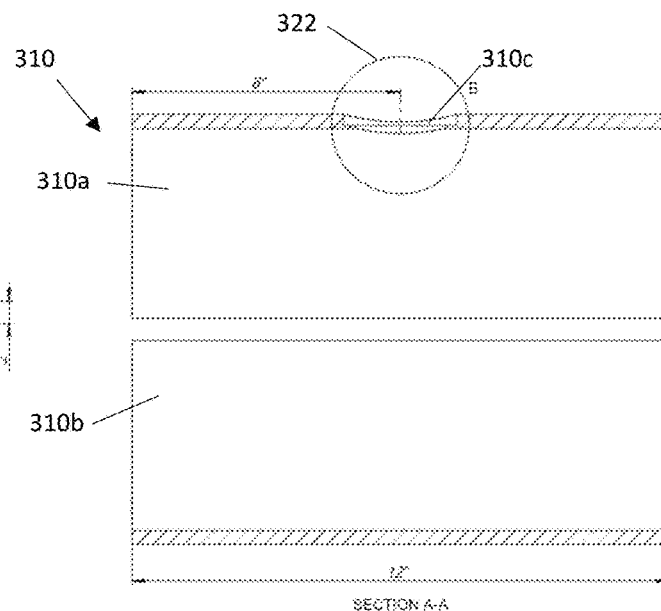
FIG. 3C illustrates the front cross-sectional view of a mounting seat along reference plane A-A, having reference area B, according to an aspect
Figure 3D:
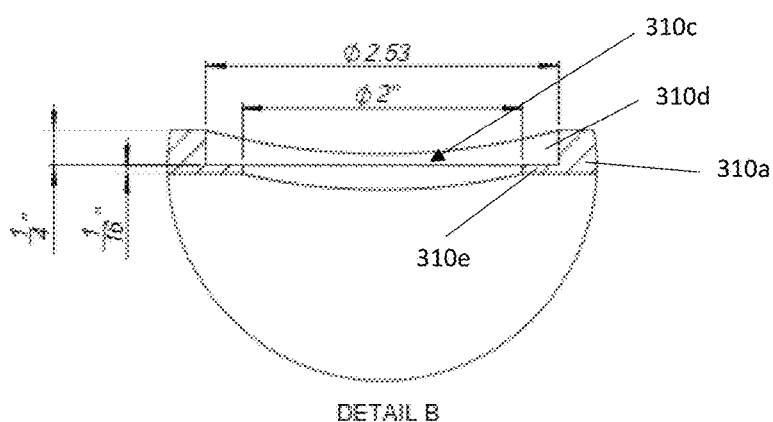
FIG. 3D illustrates the front cross-sectional view of an embodiment of a base hole within reference area B, according to an aspect.

FIG. 3A illustrates the top perspective view of an embodiment of a mounting seat 310, according to an aspect. FIG. 3B illustrates the side elevation view of an embodiment of a mounting seat 310 having reference plane A-A 321, according to an aspect. FIG. 3C illustrates the front cross-sectional view of a mounting seat 310 along reference plane A-A 321, having reference area B 322, according to an aspect. FIG. 3D illustrates the front cross-sectional view of an embodiment of a base hole 310c within reference area B, according to an aspect. As described hereinabove, the mounting seat 310 may be configured to engage with a pipe through the utilization of welding, through the utilization of base screws, such as base screws 107 of FIG. 1A, or any other applicable engagement method that ensures a secure attachment of the corresponding safe service fitting to said pipe.

The mounting seat may be comprised of an upper mounting seat section 310a having a base hole 310c nested within it. In an embodiment, the mounting seat 310 may be further comprised of a lower mounting seat section 310b disposed below the upper mounting seat section 310b. It should be understood that the upper mounting seat section 310a may be configured to engage with the lower mounting seat section 310b through the utilization of base screws, such as base screw 107 of FIG. 1A, configured to engage with the upper and lower mounting seat sections 310a, 310b, such that the resultant mounting seat 310 is securely clamped around a pipe, or other applicable structure. The upper and lower mounting seat sections 310a, 310b may be configured to surround the diameter of an appropriate portion of the pipe to ensure proper positioning in relation to other pipe elements, as applicable. In a safe service fitting embodiment that utilizes base screws, wherein the pipe to be engaged with carries an unreactive material, such as water, a base gasket, such as base gasket 1310f of FIG. 13, may be utilized in order to facilitate an airtight seal between the base and the pipe.

In an embodiment, a ¾ inch thick base gasket may be disposed between the attached pipe and the base hole 310c, or more specifically sandwiched between the pipe and the base slot floor 310e, in order to properly seal the connection between a threaded nipple, such as threaded nipple 1204 of FIG. 12, and the pipe, such as pipe 1224 of FIG. 12. Each gasket utilized herein may be comprised of rubber, or another suitable material configured to not be degraded or damaged by a fluid being carried within the attached pipe. In an alternative embodiment, the lower mounting seat section 310b may be omitted from the structure of the mounting seat 310 and the upper mounting seat section 310a may be welded directly to the applicable pipe structure, thus facilitating the secure engagement of the mounting seat 310 to the pipe without the use of base screws.

As can be seen in FIG. 3D, the base hole 310c may be surrounded by a base slot 310d. A complementary service tap, such as threaded nipple 1104 of FIG. 11A, may be configured to be seated within the base slot 310d to facilitate secure engagement of the base with corresponding pipe flow controller, as will be discussed in greater detail hereinbelow. In an embodiment, the base slot 310d may form a pocket within the outer surface of the upper mounting section 310a in which the threaded nipple may be seated and welded into place, in order to allow the attached pipe to be tapped, facilitating fluid communication between the pipe and an attached flow controller.

In an embodiment, upon engagement of the base 310 with a pipe, the bottom edge of the upper mounting seat section 310a may be separated from the upper edge of the lower mounting seat section 310b by a distance of about 0.5 inches. In said embodiment, the thickness of the upper and lower mounting seat sections 310a, 310b may be such that the inner diameter of the mounting seat 310 is approximately 9 inches, whereas the outer diameter of the mounting seat 310 while installed may be approximately 9⅝ inches, as seen in FIG. 3B. In an embodiment, the distance between the center of the base hole 310c and the lateral edges of the upper mounting seat section 310a may be about 6 inches, such that the total length of the base 310 is about 12 inches, as seen in FIG. 3C. In an embodiment, the base hole 310c and the base slot 310d may be coaxially aligned, wherein the base hole 310c may have a diameter of about 2 inches and the base slot 310d may have a diameter of 2.53 inches, as seen in FIG. 3D. In said embodiment, the base slot 310d may have a depth of about 3/16 inch, wherein the upper mounting seat section 310a may have a thickness of about ¼ inch, thus forming a base slot floor 310e having a thickness of 1/16 inch.

Figure 4A:
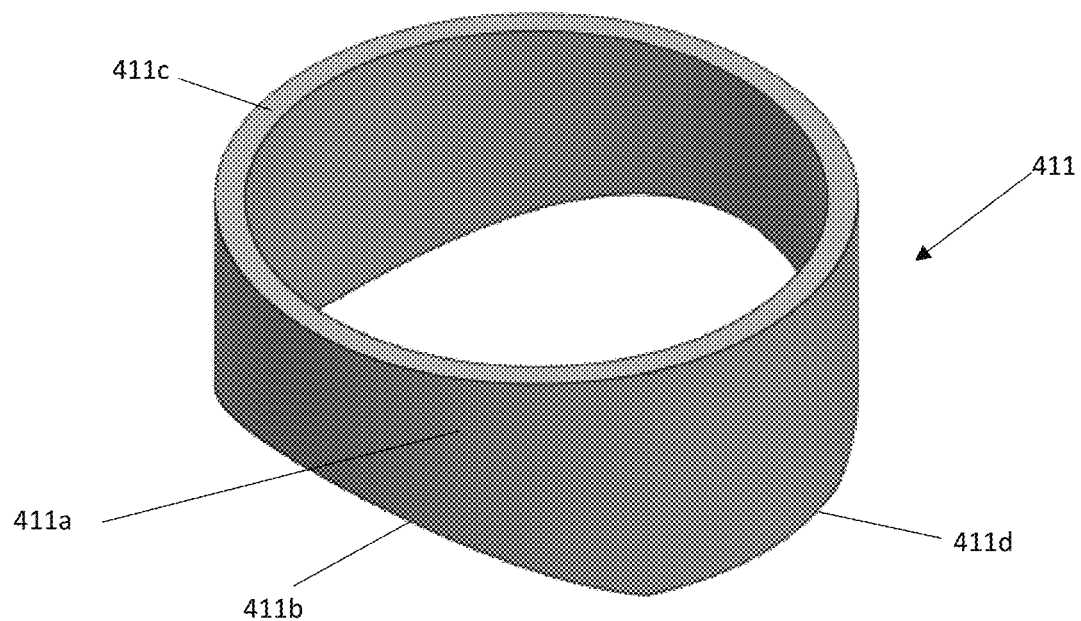
FIG. 4A illustrates the top perspective view of an embodiment of a base ring, according to an aspect.
Figure 4B:
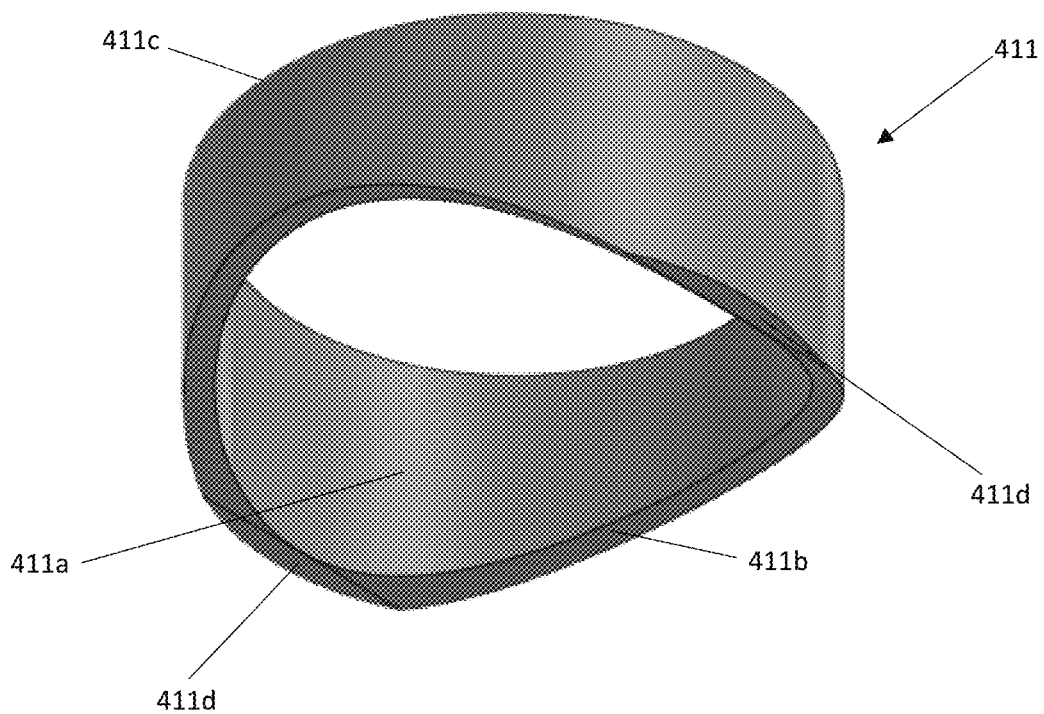
FIG. 4B illustrates the bottom perspective view of an embodiment of a base ring, according to an aspect.
Figure 4C:
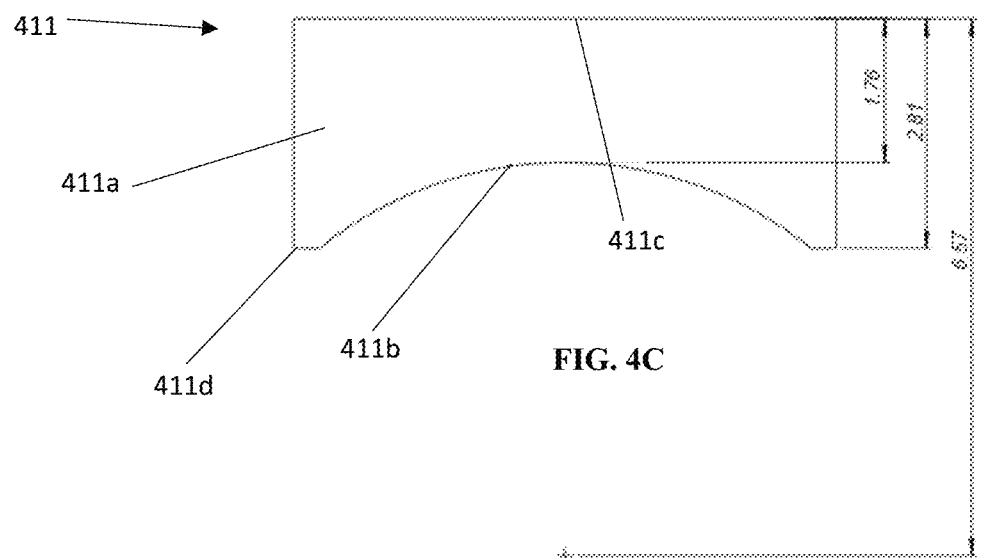
FIG. 4C illustrates the side elevation view of an embodiment of a base ring, according to an aspect.
Figure 4D:
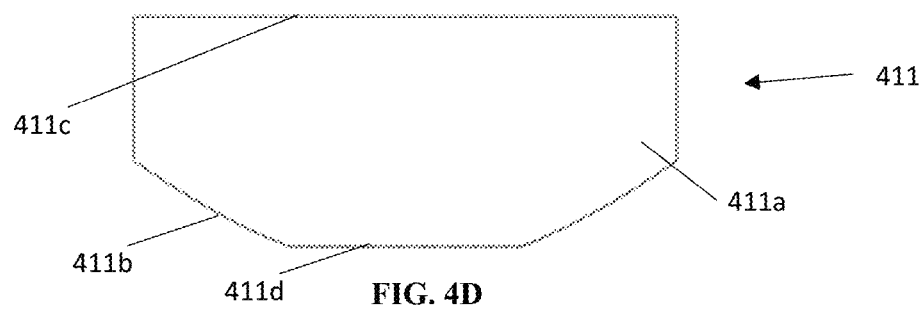
FIG. 4D illustrates the front elevation view of an embodiment of a base ring, according to an aspect.
Figure 4E:
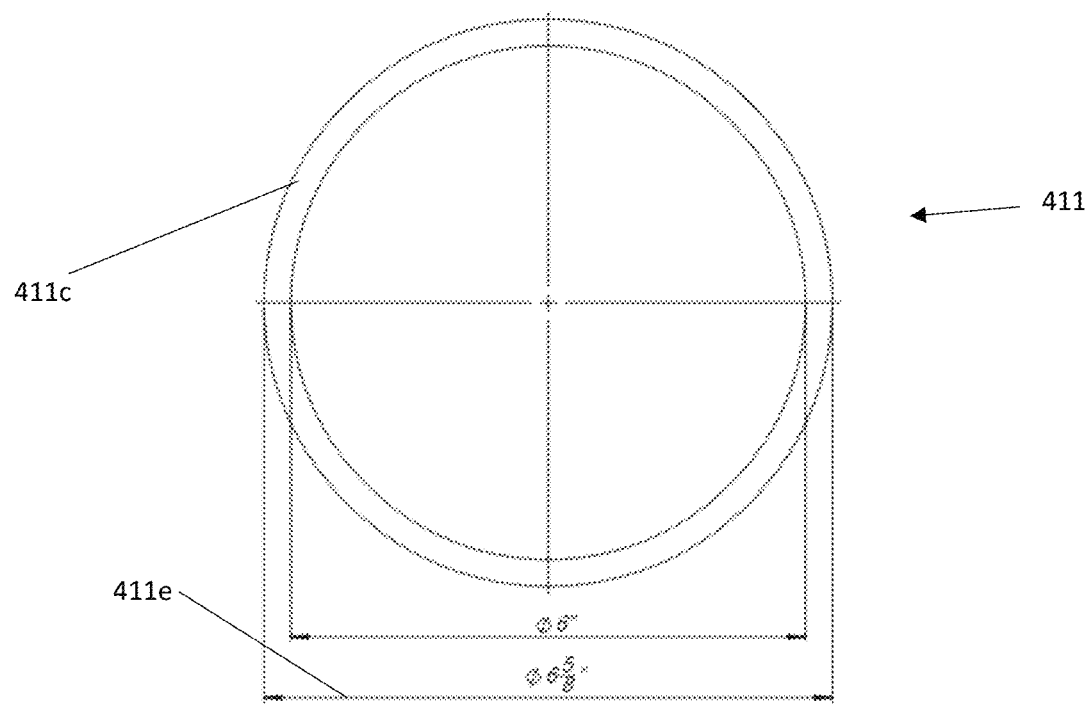
FIG. 4E illustrates the top plan view of an embodiment of a base ring, according to an aspect.

FIG. 4A illustrates the top perspective view of an embodiment of a base ring 411, according to an aspect. FIG. 4B illustrates the bottom perspective view of an embodiment of a base ring 411, according to an aspect. FIG. 4C illustrates the side elevation view of an embodiment of a base ring 411, according to an aspect. FIG. 4D illustrates the front elevation view of an embodiment of a base ring 411, according to an aspect. FIG. 4E illustrates the top plan view of an embodiment of a base ring 411, according to an aspect. As disclosed hereinabove, the base ring may be configured to be engaged with/be attached to both the mounting seat and the base flange. The base ring 411 may have a base ring body 411a having a flat base ring top surface 411c, curved base ring bottom surfaces 411b disposed below the flat base ring top surface 411c and flat base sections 411d disposed between the curved base ring bottom surfaces 411b, as seen in FIG. 4A, 4B.

As seen in FIG. 2A-2B, the flat base ring top surface 411c may be configured to engage with a correspondingly flat base flange, such as base flange 212 of FIG. 2A. Furthermore, the curved base ring bottom surfaces 411b may be configured to engage with a corresponding curved surface of the mounting seat, such as mounting seat 210 of FIG. 2A. It should be understood that the shape, dimensions and curvature of the curved base ring bottom surfaces 411b may be influenced by the shape and curvature of the mounting seat and the pipe that it engages with.

In an embodiment, the base ring 411 may have a shortest height of about 1.76 inches at points where the distance between the flat base ring top surface 411c and a curved base ring bottom surface 411b is minimized. In the same embodiment, the base ring 411 may have a tallest height of about 2.81 inches where the distance between the flat base ring top surface 411c and a curved base ring bottom surface 411b is maximized. In this same embodiment, the height of the ring between the flat base ring top surface 411c and the flat base sections 411d may be about 2.81 inches consistently across the corresponding portions of the base ring, as the flat base sections 411d may be flat and parallel with flat base ring top surface 411c. The base ring may have an inner diameter of about 6 inches and an outer diameter of about 6⅝ inches. The outer diameter of the base ring 411e may be referred to as a "first outer diameter" 411e when comparing it to other structures, as will be described hereinbelow.

Figure 5A:
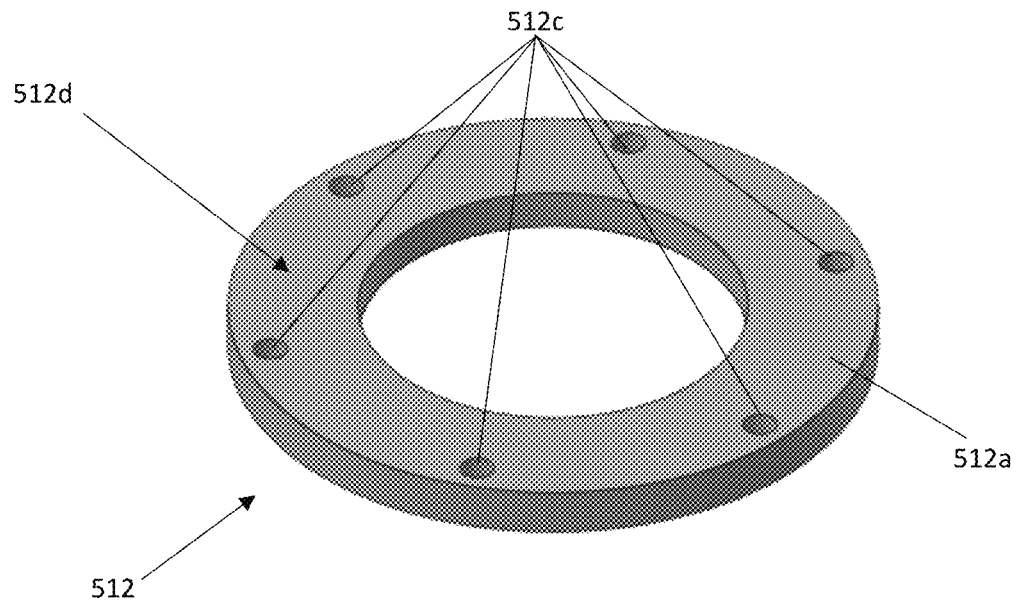
FIG. 5A illustrates the top perspective view of an embodiment of a base flange, according to an aspect.
Figure 5B:
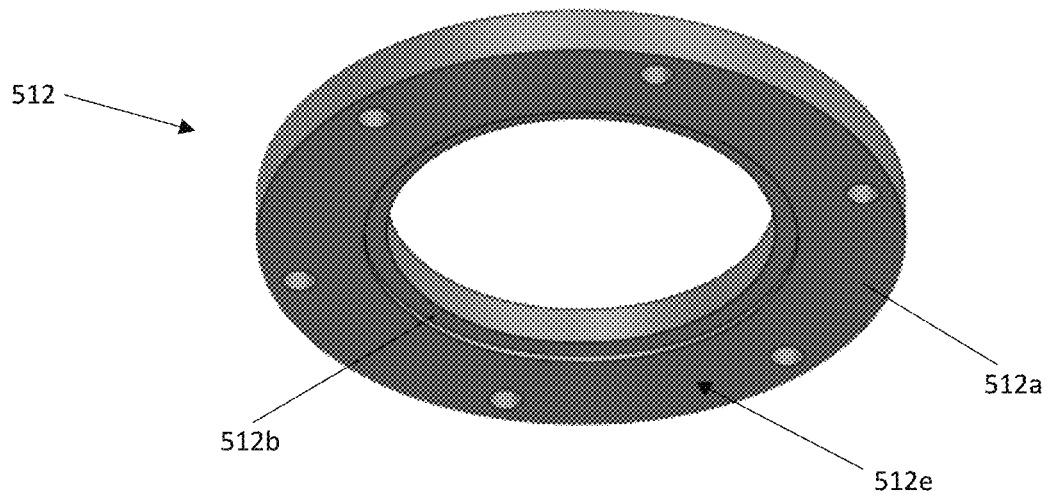
FIG. 5B illustrates the bottom perspective view of an embodiment of a base flange, according to an aspect.
Figure 5C:
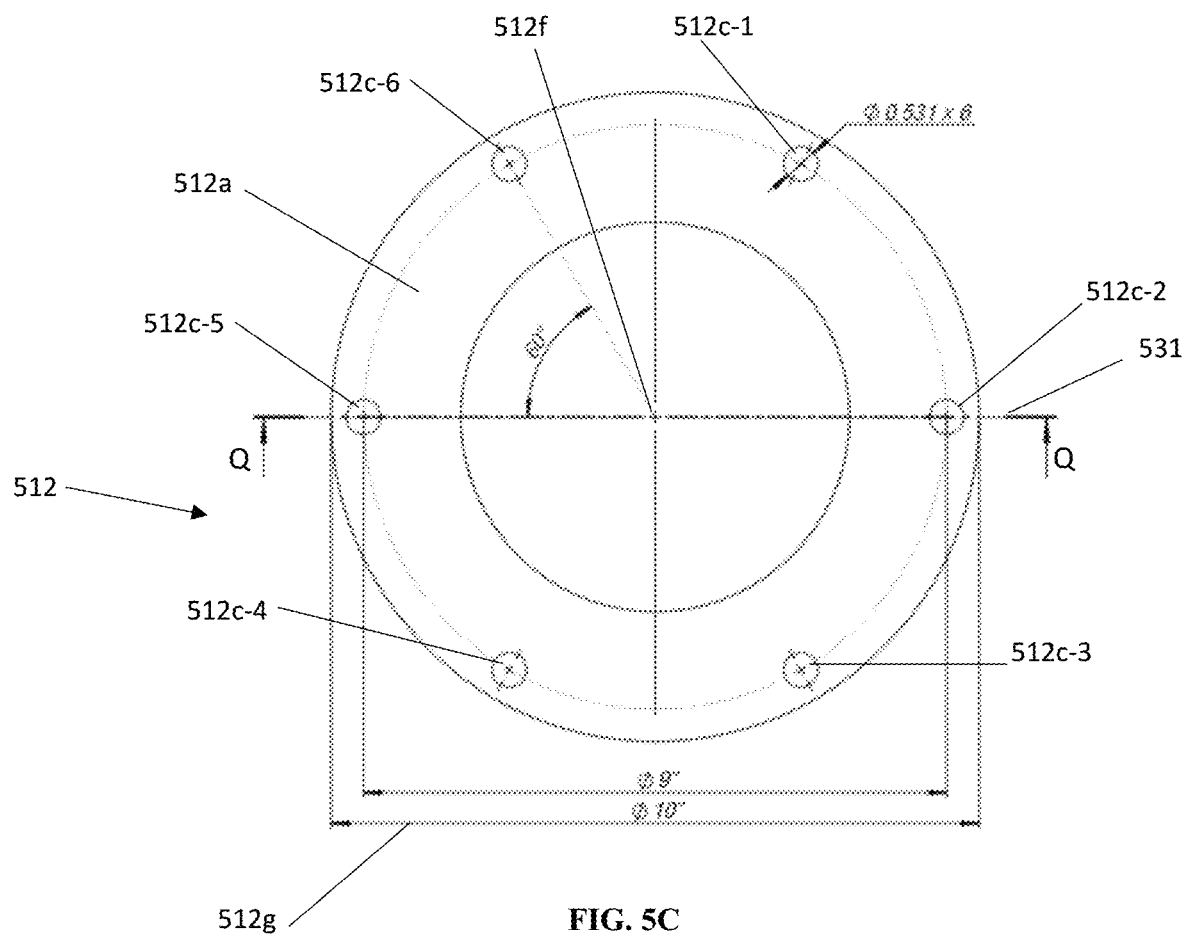
FIG. 5C illustrates the top plan view of an embodiment of a base flange having reference plane Q-Q, according to an aspect.
Figure 5D:
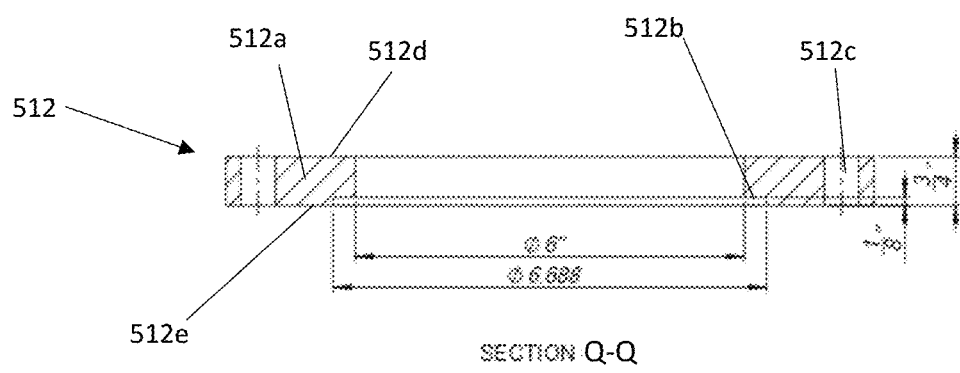
FIG. 5D illustrates the side cross-sectional view of an embodiment of a base flange along reference plane Q-Q, according to an aspect.

FIG. 5A illustrates the top perspective view of an embodiment of a base flange 512, according to an aspect. FIG. 5B illustrates the bottom perspective view of an embodiment of a base flange 512, according to an aspect. FIG. 5C illustrates the top plan view of an embodiment of a base flange 512 having reference plane Q-Q 531, according to an aspect. FIG. 5D illustrates the side cross-sectional view of an embodiment of a base flange 512 along reference plane Q-Q 531, according to an aspect. The base flange 512 is configured to engage with the base ring, wherein the base flange 512 is further configured to engage with the top hat, such as top hat 103 of FIG. 1A. The base flange 512 may engage directly with the top hat flange, such as top hat flange 613 of FIG. 6A through the utilization of top hat bolts, such as top hat bolts 109 of FIG. 1A.

The base flange 512 may be comprised of a base flange body 512a having a top surface 512d and a bottom surface 512e. The base flange 512 may be further comprised of a base ring slot 512b nested within the bottom surface 512e of the base flange body 512a. The base ring may be configured to be partially nested within the base ring slot 512b in order to facilitate a secure engagement between the base flange 512 and the base ring. A plurality of bolt holes may be nested within the base flange body 512a between the top surface 512d and the bottom surface 512e of the base flange body 512a. In an embodiment, six bolt holes 512c may be nested within the base flange body 512a such that they are evenly places around the base flange (e.g., disposed at 60-degree angle of separation away from each other, as seen by fifth and sixth bolt holes 512c-5, 512c-6 of FIG. 5C). The six bolt holes 512c may be comprised of a first bolt hole 512c-1, a second bolt hole 512c-2, a third bolt hold 512c-3, a fourth bolt hole 512c-4, a fifth bolt hole 512c-5 and a sixth bolt hole 512c-6. These bolt holes 512c-1, 512c-2, etc., may be configured to align with complementarily positioned bolt holes nested within the top hat, as will be described in greater detail hereinbelow. In an embodiment, each bolt hole 512c may have a diameter of about 0.531 inches. The center of each bolt hole may be positioned the same radial distance from the radial center 512f of the base flange, wherein the distance between the second bolt hole 512c-2 and the fifth bolt hole 512c-5, as well as other opposing sets of bolt holes (the first bolt hole 512c-1 and the fourth bolt hole 512c-4, for example) may be about 9 inches.

In alternative embodiments, different quantities of bolt holes may be nested in the base flange 512, while also having a complementary quantity of bolt holes nested in the top hat flange, such as top flange 713 of FIG. 7A-7D. In one such alternative embodiment, eight complementarily placed bolt holes may be nested within each flange (base flange 512, top hat flange 713 of FIG. 7A), such that one top hat bolt, such as top hat bolt 109 of FIG. 1A, may be nested within each pair of complementarily placed bolt holes, for a total of eight top hat bolts. In an embodiment, the herein disclosed six bolt hole 512c embodiment of FIG. 5A-5D may be utilized for safe service fittings configured to attach to smaller pipes having diameters ranging from 2 inches to 10 inches, whereas the described eight bolt hole embodiment may be configured for use with safe service fittings that engage with pipes having larger diameters ranging from 10 inches to 36 inches. It should be understood that the two additional bolts holes 512c provided on the eight bolt hole embodiments of safe service fittings configured for use with larger pipes are configured to help account for potential stress differences that may occur when working with larger diameter pipes, thus facilitating a stronger engagement between the top hat and base as necessary.

In an embodiment, the outer diameter 512g of the base flange 512 may be about 10 inches, whereas the inner diameter of the base flange 512 may be about 6 inches. This large outer diameter of the base flange 512 helps to provide a protective barrier around the enclosed elements. In an embodiment, the ring slot 512c may have an inner diameter of about 6 inches, an outer diameter of about 6.688 inches and a depth of about ⅛ inch, such that an appropriately sized base ring, such as base ring 411 of FIG. 4E, may be securely nested within the ring slot 512c. The base flange body 512a may have a height of % of an inch in the present embodiment. The outer diameter of the base flange 512g may be referred to as a "second outer diameter" 512g when comparing it to other structures, as will be described hereinbelow. In an embodiment, the "second outer diameter" 512g may be greater than the "first outer diameter" of the base ring, such as first outer diameter 411e of FIG. 4E, to provide a protective barrier around said base ring.

Figure 6A:
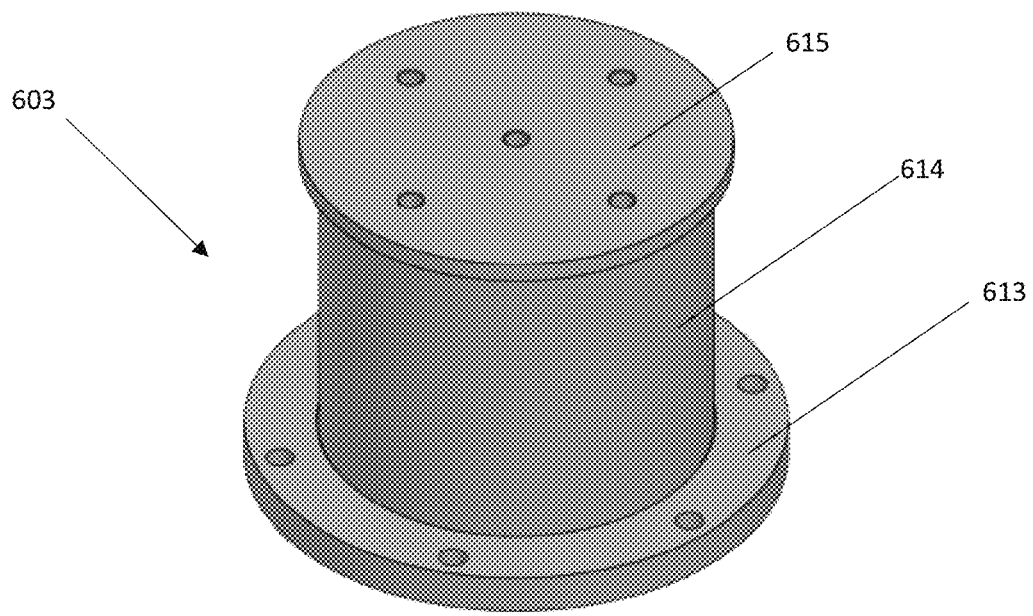
FIG. 6A illustrates the top perspective view of an embodiment of a top hat, according to an aspect.
Figure 6B:
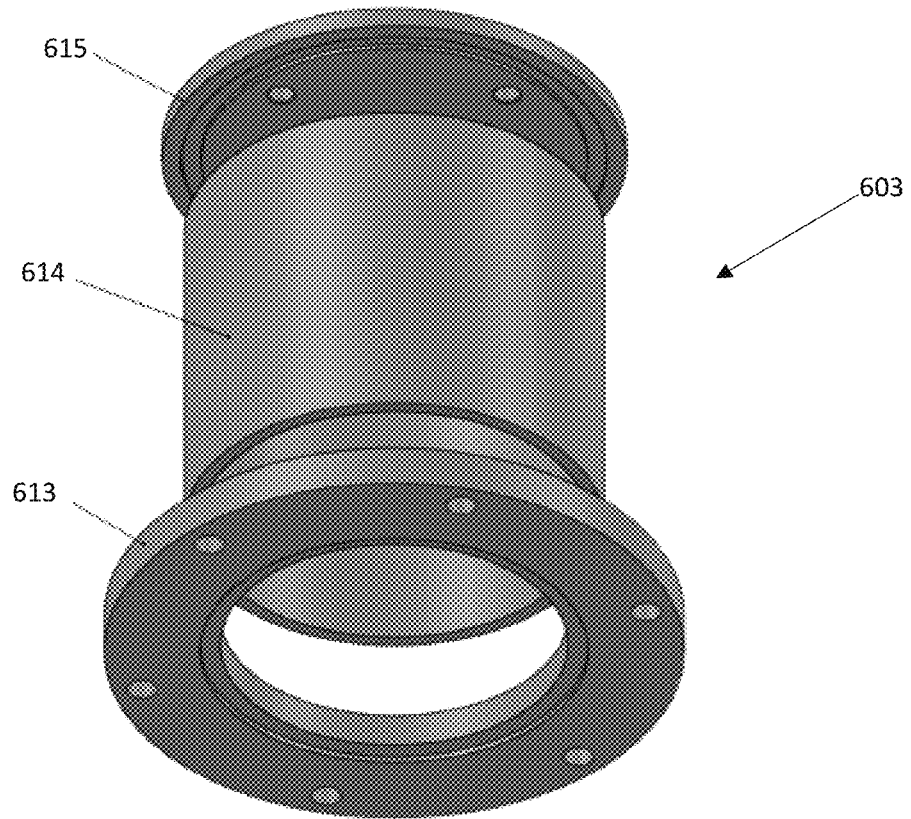
FIG. 6B illustrates the exploded view of an embodiment of a top hat, according to an aspect.
Figure 6C:
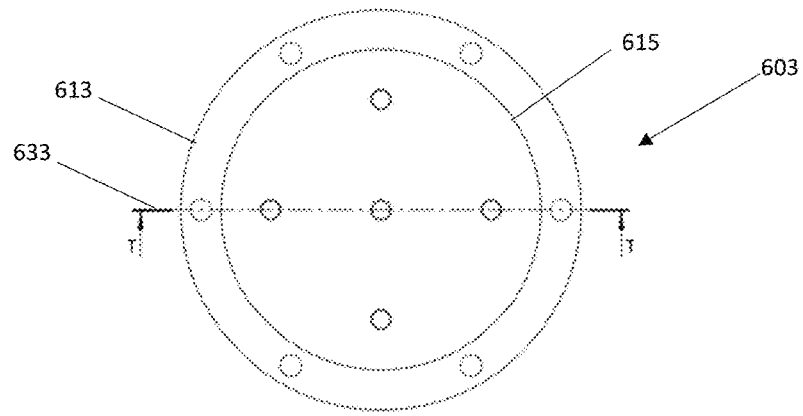
FIG. 6C illustrates the top plan view of an embodiment of a top hat having reference plane T-T, according to an aspect.
Figures 6D, 6E:
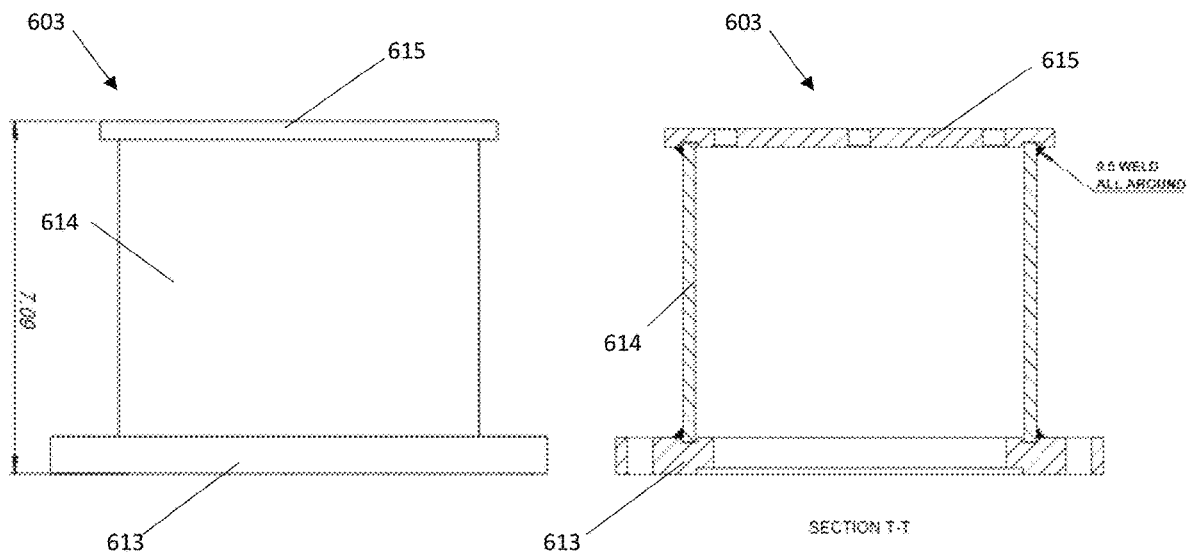
FIG. 6D illustrates the side elevation view of an embodiment of a top hat, according to an aspect.
FIG. 6E illustrates the side cross-sectional view of an embodiment of a top hat along reference plane T-T, according to an aspect.

FIG. 6A illustrates the top perspective view of an embodiment of a top hat 603, according to an aspect. FIG. 6B illustrates the exploded view of an embodiment of a top hat 603, according to an aspect. FIG. 6C illustrates the top plan view of an embodiment of a top hat 603 having reference plane T-T 633, according to an aspect. FIG. 6D illustrates the side elevation view of an embodiment of a top hat 603, according to an aspect. FIG. 6E illustrates the side cross-sectional view of an embodiment of a top hat 603 along reference plane T-T 633, according to an aspect. The disclosed top hat 603 is configured to engage with the aforementioned base, such as base 202 of FIG. 2A, in order to suitably cover pipe flow controller elements to prevent rusting, corrosion, impact damage, etc. The top hat 603 may be comprised of several interconnected structures including a top hat flange 613, a top hat ring 614 configured to engage with the top hat flange 613 and a top cap 615 configured to engage with the top hat ring 614. The top hat 603 may have engagement structures, such a bolt ports 713d of FIG. 7A, that are complementarily positioned to their equivalents on the base, such as bolt ports 512c of FIG. 5A, to enable engagement between the top hat 603 and base.

While the overall height of the top hat 603 in the present embodiment from the top of the top cap 615 to the bottom of the top hat flange may be about 7.09 inches, it should be understood that the height of the top hat 603 may be modified as necessary to house each element disposed within the fitting cavity. As seen in FIG. 6E, the top cap 615 may be secured to the top hat ring 614 by a 0.5 inch weld. The interconnections of the top hat 603 structure will be described in greater detail hereinbelow.

Figure 7A:
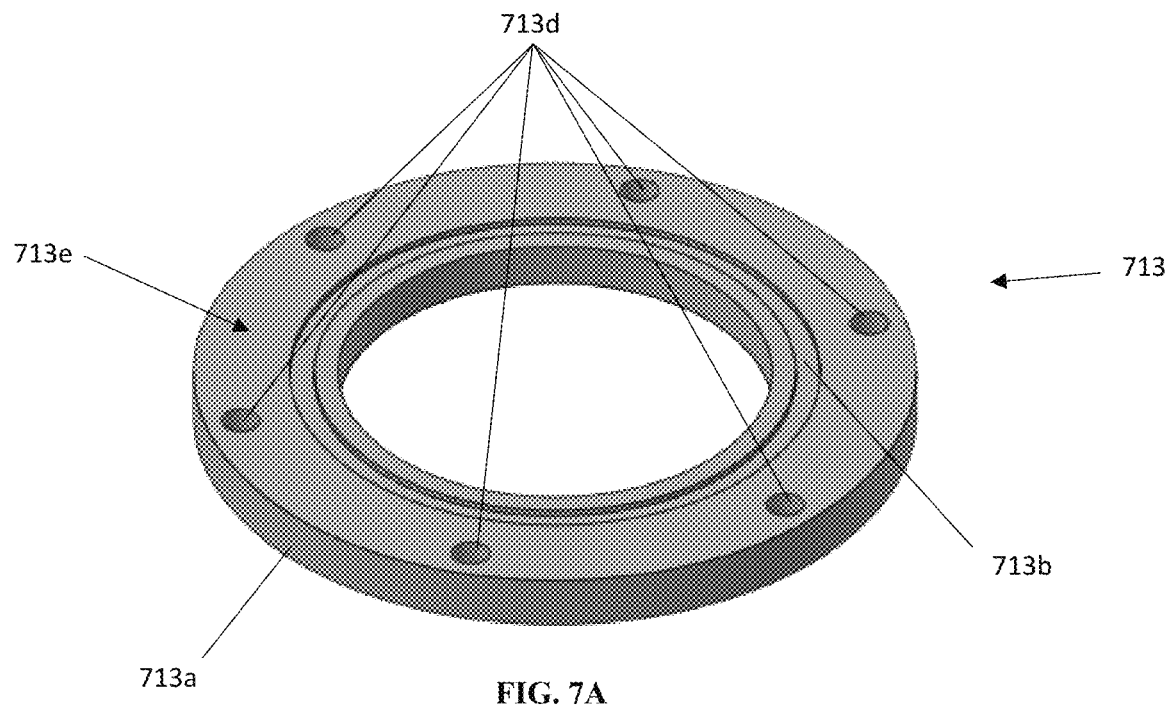
FIG. 7A illustrates the top perspective view of an embodiment of a top hat flange, according to an aspect.
Figure 7B:
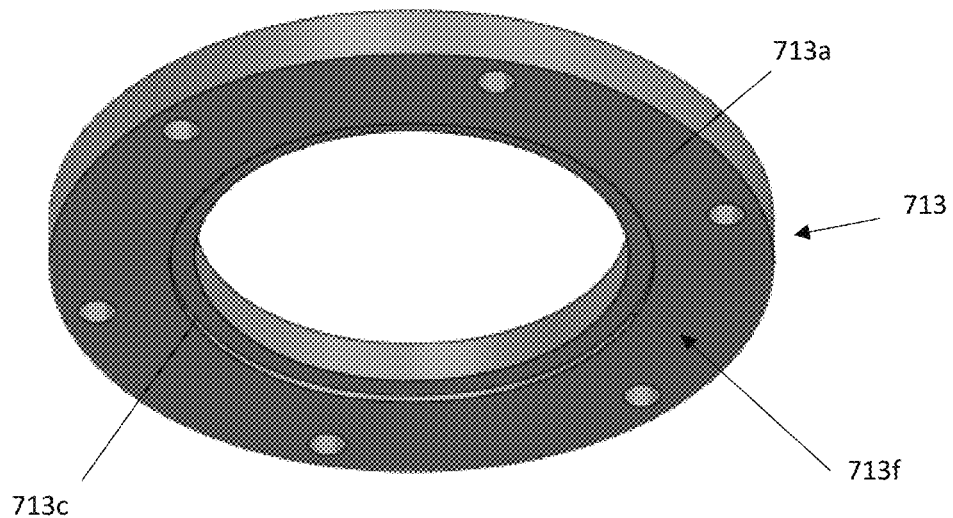
FIG. 7B illustrates the bottom perspective view of an embodiment of a top hat flange, according to an aspect.
Figure 7C:
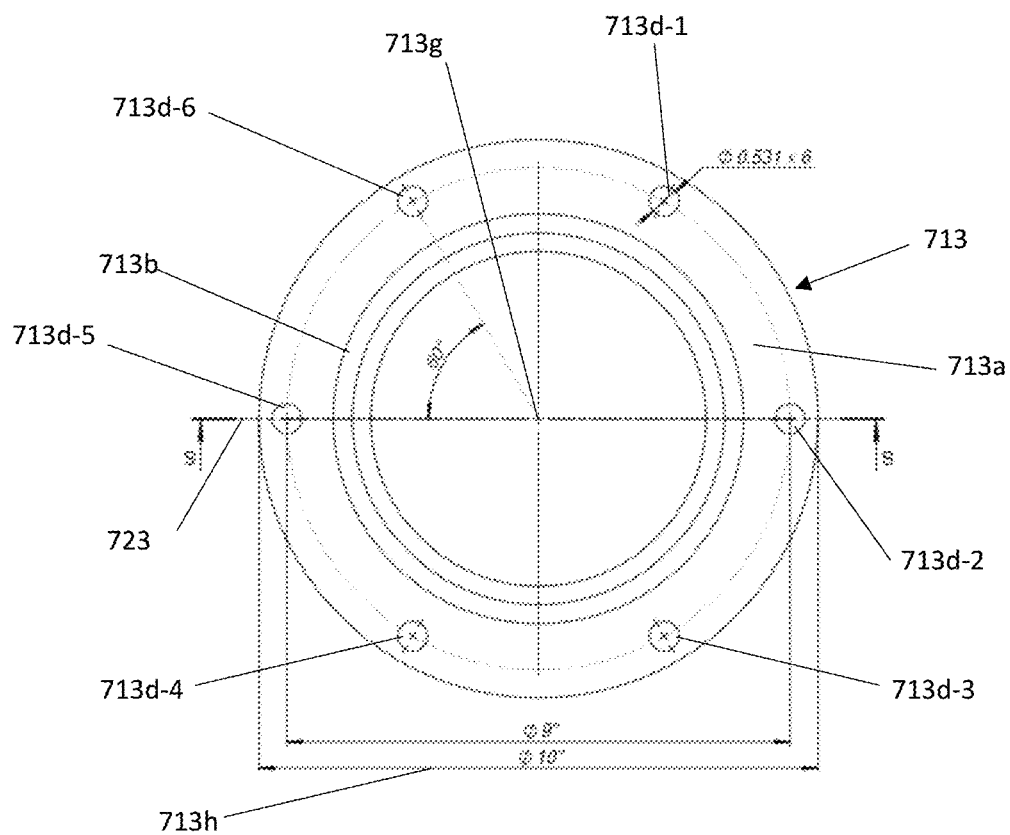
FIG. 7C illustrates the top plan view of an embodiment of a top hat flange having reference plane S-S, according to an aspect.
Figure 7D:
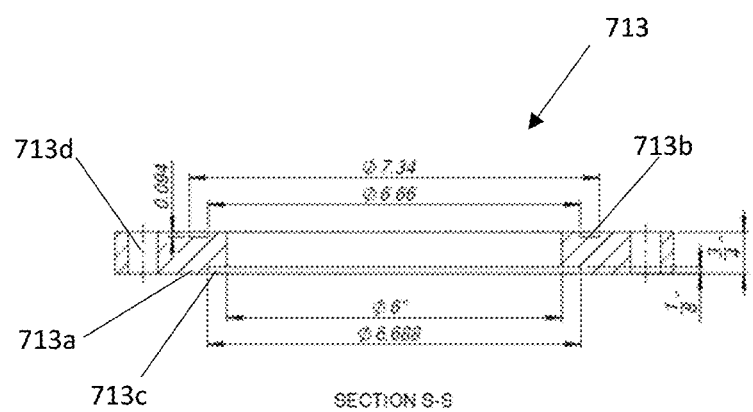
FIG. 7D illustrates the side cross-sectional view of an embodiment of a top hat flange along reference plane S-S, according to an aspect.

FIG. 7A illustrates the top perspective view of an embodiment of a top hat flange, according to an aspect. FIG. 7B illustrates the bottom perspective view of an embodiment of a top hat flange, according to an aspect. FIG. 7C illustrates the top plan view of an embodiment of a top hat flange having reference plane S-S 723, according to an aspect. FIG. 7D illustrates the side cross-sectional view of an embodiment of a top hat flange along reference plane S-S 723, according to an aspect. The disclosed top hat flange 713 may be very similar to the prior disclosed the base flange, such as base flange 512 of FIG. 5A, with the exception of the ring body slot 713*b* found only in the prior.

The top hat flange 713 may have a top hat flange body 713*a* having a top surface 713*e* and a bottom surface 713*f*. The top hat flange 713 may be further comprised of top flange ring slot 713*b* nested within the top surface 713*e* of the top hat flange body 713*a* and a base slot 713*c* nested within the bottom surface 713*f* of the of the top hat flange body 713*a*. In an embodiment, the top flange ring slot 713*b* may have an inner diameter of about 6.66 inches, an outer diameter of about 7.34 inches and a depth of about 0.094 inches, as can be seen in FIG. 7D. Similarly to the base ring slot 512*b* of FIG. 5D, in an embodiment, the base slot 713*c* may have an inner diameter of about 6 inches, an outer diameter of about 6.688 inches and a depth of about ⅛ inch. The top hat flange 713 may also have a height of about ¾ of an inch, as seen by the embodiment of FIG. 7D. It should be understood that in certain embodiments, the base slot 713*c* of the top hat flange 713 may be omitted, as the base slot 713*c* itself may not be configured to engage with any additional structures. The outer diameter of the top hat flange 713*h* may be referred to as a "third outer diameter" 713*h* when comparing it to other structures, as will be described hereinbelow. In an embodiment, the "third outer diameter" of the top hat flange 713 may be equivalent to the "second outer diameter" of the base flange, both of which may be larger than the first outer diameter.

As described hereinabove, the top hat flange 713 may be further comprised of a plurality of bolt holes 713*d* nested within the top hat flange body 713*a*. In an embodiment, each bolt hole 713*d* of the top hat flange 713 may have a diameter of about 0.531 inches. As described for the base flange 512 of FIG. 5A-5D disclosed hereinabove, each pair of opposing bolt holes (713*d*-2 and 713*d*-5, for example) may be disposed about 9 inches apart, such that each bolt hole 713*d* is disposed 4.5 inches from the radial center 713*g* of the top hat flange 713, thus forming a circle of equidistantly disposed bolt hole 713*d* around the radial center 713*g* of the top hat flange 713, each of which is nested within the top hat flange body 713*a*. As such, each bolt hole of the plurality of bolt holes 713*d* nested within top hat flange body 713*a* may be separated by a 60-degree angle, as seen in FIG. 7C. The plurality of bolt holes 713*d* nested within the top hat flange body 713*a* may include a first bolt hole 713*d*-1, a second bolt hole 713*d*-2, a third bolt hole 713*d*-3, a fourth bolt hole 713*d*-4, a fifth bolt hole 713*d*-5 and a sixth bolt hole 713*d*-6. Each bolt hole 713*d*-1, 713*d*-2, 713*d*-3, etc. of the plurality of bolt holes 713*d* nested within the top hat flange body 713*a* may be configured to coaxially align with a corresponding bolt hole 512*c*-1, 512*c*-2, 512*c*-3, etc., of the plurality of bolt holes 512*c* nested within the base flange 512 of FIG. 5C. For example, a first bolt hole 713*d*-1 of the top hat flange 713 may be configured to coaxially align with a first bolt hole 512*c*-1 of the base flange 512 of FIG. 5C, such that upon coaxially alignment of said first bolt holes 713*d*-1, 512*c*-1, a top hat bolt, such as top hat bolt 109 of FIG. 1A may be threaded through both first bolt holes 713*d*-1, 512*c*-1 to secure the top hat flange 713 to the base flange 512, securing the top hat to the base accordingly. This process may be repeated, but with the corresponding pairs of second bolt holes 512*c*-2, 713*d*-2, third bolt holes 512*c*-3, 713*d*-3, etc., until a top hat bolt is threaded through each corresponding pair of bolt holes. This in turn will fully secure the top hat to the base.

Figure 8A:
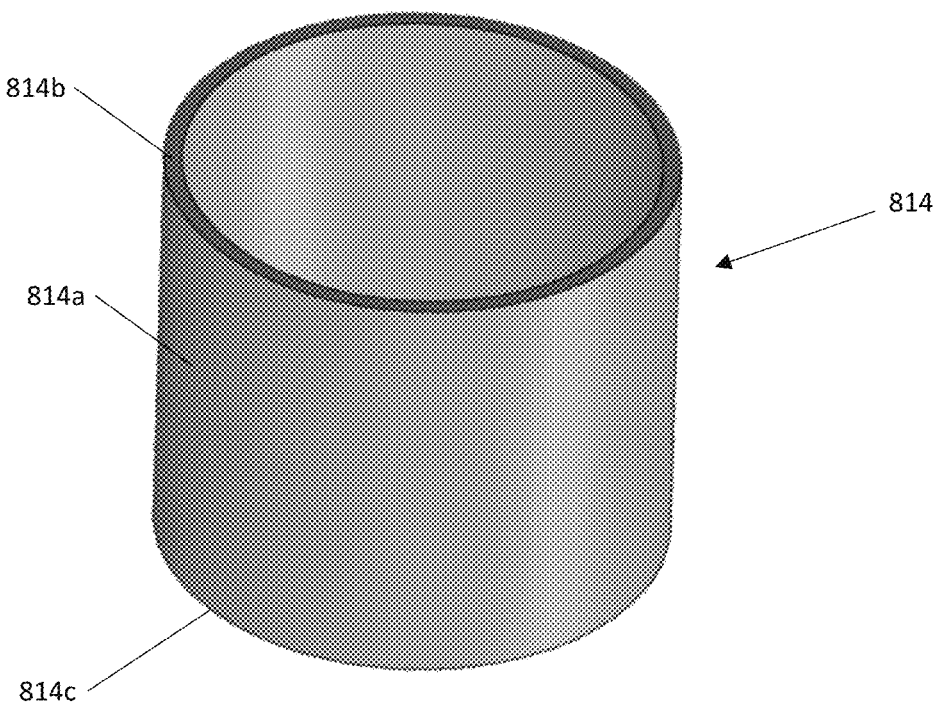
FIG. 8A illustrates the top perspective view of an embodiment of a top hat ring, according to an aspect.
Figure 8B:
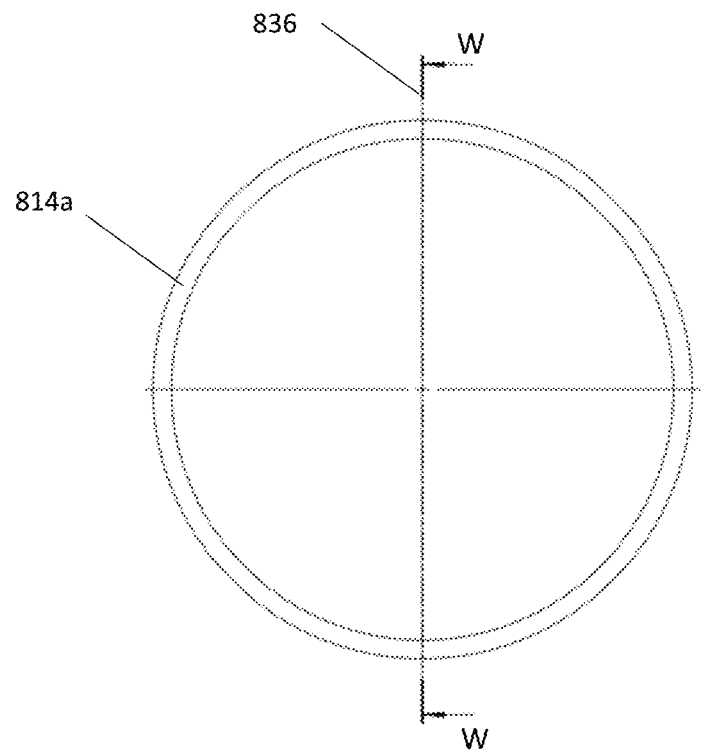
FIG. 8B illustrates the top plan view of an embodiment of a top hat ring having reference plane W-W, according to an aspect.
Figure 8C:
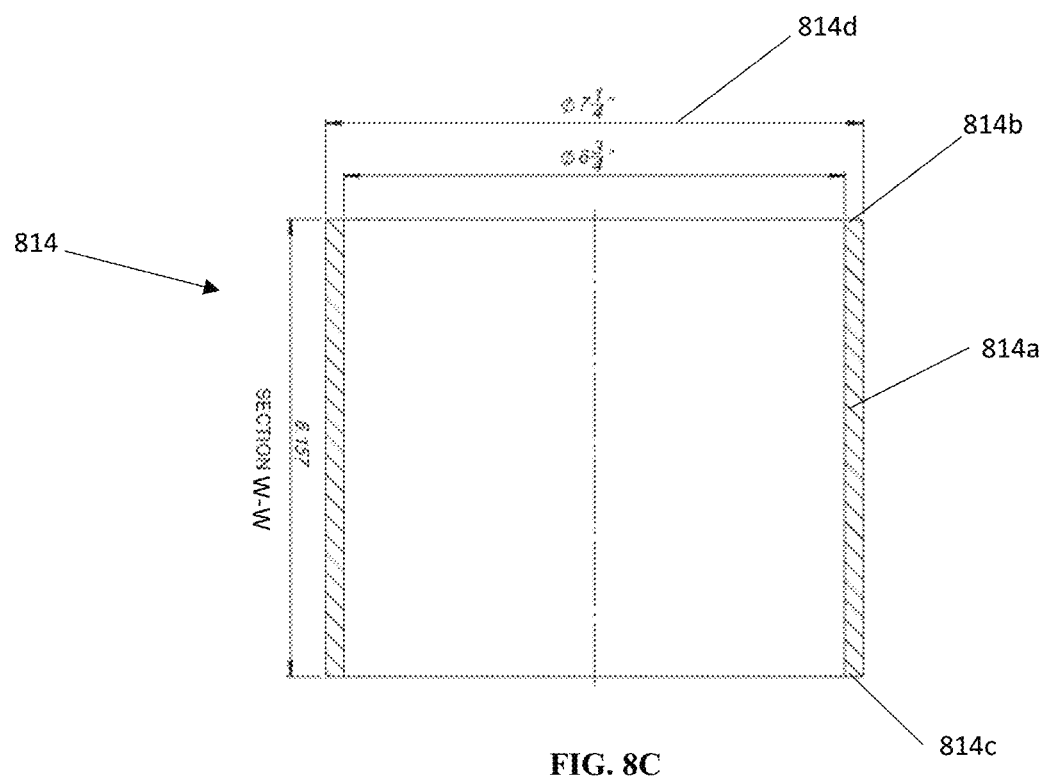
FIG. 8C illustrates the side cross-sectional view of an embodiment of a top hat ring along reference plane W-W, according to an aspect.

FIG. 8A illustrates the top perspective view of an embodiment of a top hat ring, according to an aspect. FIG. 8B illustrates the top plan view of an embodiment of a top hat ring having reference plane W-W 836, according to an aspect. FIG. 8C illustrates the side cross-sectional view of an embodiment of a top hat ring along reference plane W-W 836, according to an aspect. The top hat ring 814 may be comprised of a top hat ring body 814*a* having a flat top surface 814*b* and a flat bottom surface 814*c*. In an embodiment, the flat top surface 814*b* and the flat bottom surface 814*c* of the top hat ring 814 may be parallel with each other, such that the top hat ring has a consistent height around its radius, as seen in FIG. 8C. In an embodiment, the top hat ring 814 may have an inner diameter of about 6⅝ inches, an outer diameter of about 7¼ inches and a height of about 6.157 inches, such that the bottom surface 814*c* of the top hat ring 814 is configured to be partially nested within the top flange ring slot 713*b* of the top hat flange 713 of FIG. 7A-7D. Again, the size and shape of each of the herein disclosed elements of the safe service fitting may be varied accordingly as needed by the user to accommodate different sizes, shapes or types of pipes. The outer diameter of the top hat ring 814*d* may be referred to as a "fourth outer diameter" 814*d* when comparing it to other structures, as will be described hereinbelow, wherein the fourth outer diameter may be smaller than the third outer diameter, but larger than the first outer diameter.

Figure 9A:
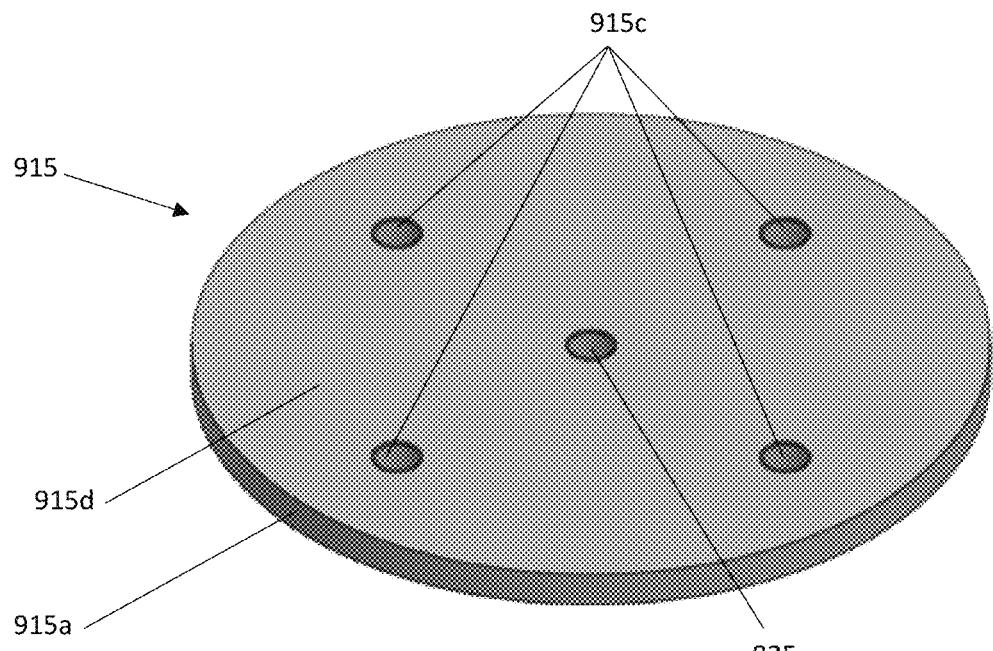
FIG. 9A illustrates the top perspective view of an embodiment of a top cap, according to an aspect.
Figure 9B:
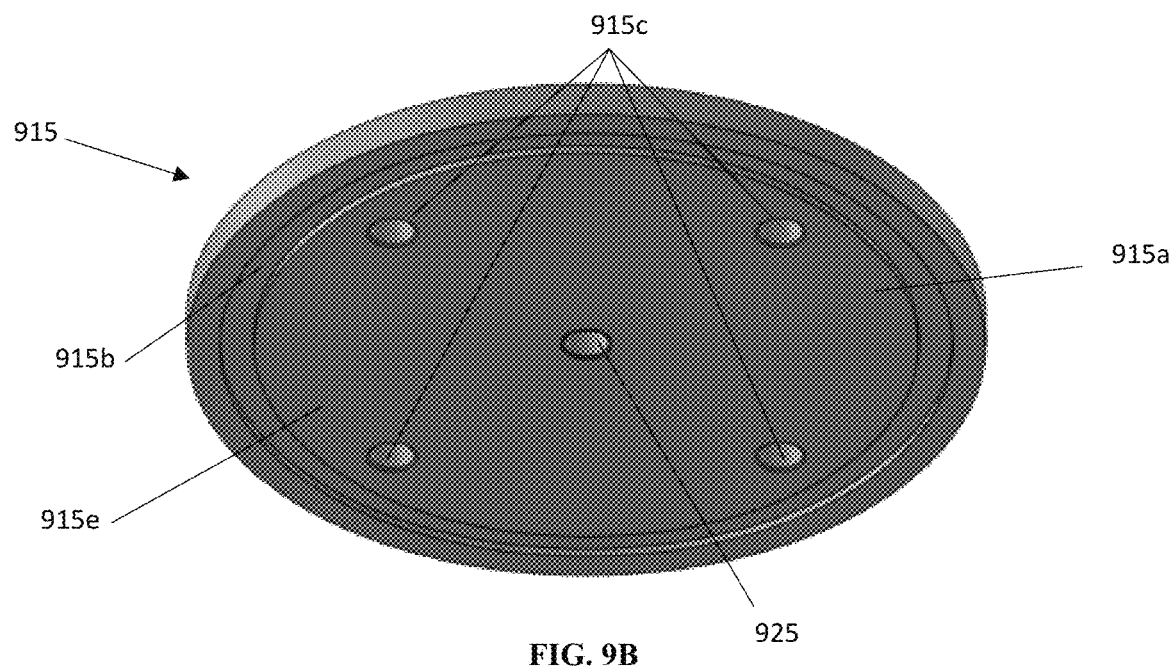
FIG. 9B illustrates the bottom perspective view of an embodiment of a top cap, according to an aspect.
Figure 9C:
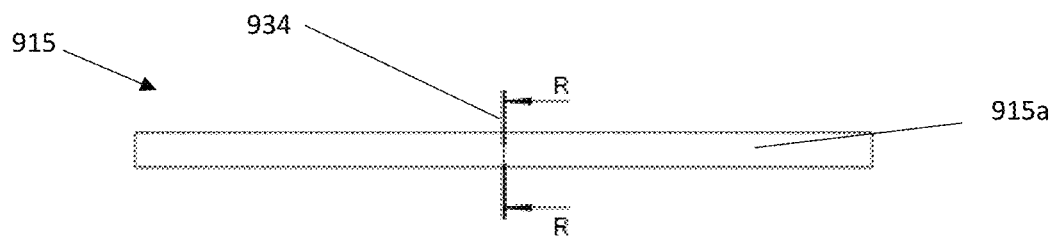
FIG. 9C illustrates the side elevation view of an embodiment of a top cap having reference plane R-R, according to an aspect.
Figure 9D:
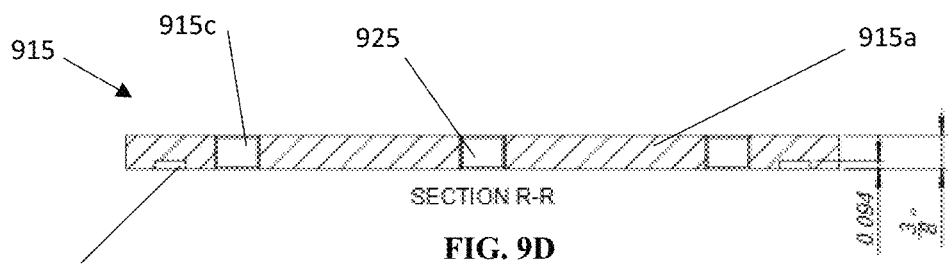
FIG. 9D illustrates the front cross-sectional view of an embodiment of a top cap along reference plane R-R, according to an aspect.
Figure 9E:
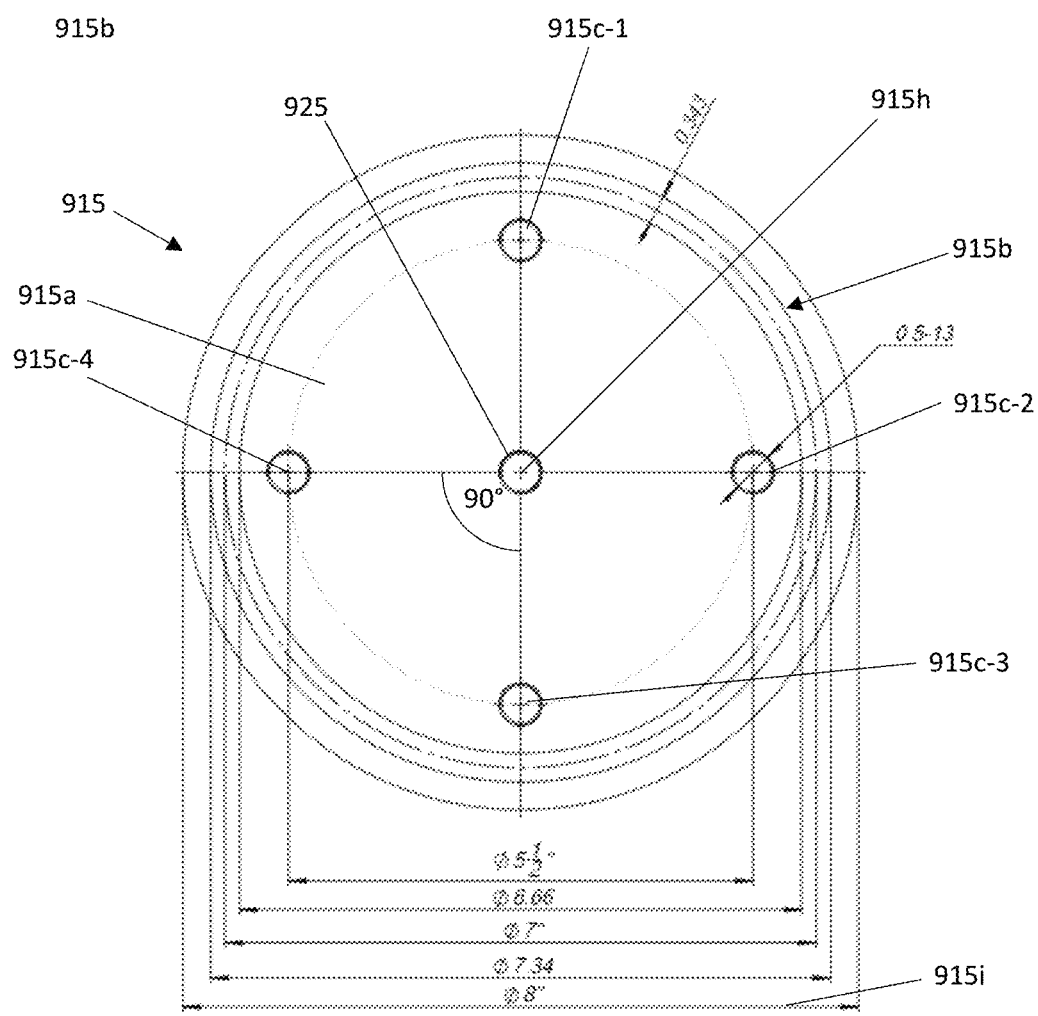
FIG. 9E illustrates the bottom plan view of an embodiment of a top cap, according to an aspect.

FIG. 9A illustrates the top perspective view of an embodiment of a top cap 915, according to an aspect. FIG. 9B illustrates the bottom perspective view of an embodiment of a top cap 915, according to an aspect. FIG. 9C illustrates the side elevation view of an embodiment of a top cap 915 having reference plane R-R 934, according to an aspect. FIG. 9D illustrates the front cross-sectional view of an embodiment of a top cap 915 along reference plane R-R 934, according to an aspect. FIG. 9E illustrates the bottom plan view of an embodiment of a top cap 915, according to an aspect. The top cap 915 may configured to engage with the top hat ring in order to provide a cover over the top of top hat ring. The top cap 915 may be comprised of a cap body 915*a* having a top surface 915*d* and a bottom surface 915*e*. The top cap 915 may be further comprised of a cap ring slot 915*b* nested within the bottom surface 915*e* of the cap body 915*a*. The cap ring slot 915*b* of the top cap 915 may be suitably configured to engage with the top surface of the top hat ring, such as top surface 814*b* of top hat ring 814 of FIG. 8A, such that the top surface of the top hat ring is partially nested within the cap ring slot 915*b*. In an embodiment, the cap ring slot 915*b* may have an inner diameter of about 6.66 inches, an outer diameter of about 7.34 inches, and a depth of about 0.094 inches to suitably allow the top hat ring to be nested within it. In an embodiment, the outer diameter of the top cap 915*i* may be about 8 inches and the top cap 915 may have a height of about ⅜ inch. The outer diameter of the top cap 915*i* may be referred to as a "fifth outer diameter" 915*i* when comparing it to other structures, which may be lesser than the third outer diameter but greater than the fourth outer diameter, as will be described hereinbelow.

The top cap 915 may also be further comprised of a plurality of cap ports 915 nested within the cap body 915*a*. Each cap port of the plurality of cap ports 915 may have a diameter configured to securely engage with a 0.500-13× 1.00LG socket head cap screw (S.H.C.S.), the socket head cap screw having a thread diameter of approximately ½ inch. As can be seen in FIG. 9E, pairs of opposing cap ports, such as the first cap port 915*c*-1 and the third cap port 915*c*-3 or the second cap port 915*c*-2 and the fourth cap port 915*c*-4 may be separated by 5½ inches (as measured from the central points of the corresponding cap ports 915*c*). The first, second, third and fourth cap ports 915*c*-1, 915*c*-2, 915*c*-3 and 915c-4 may each be disposed about 2¾ inches from a bleed off port 925 disposed at the radial center 915h of the top cap 915, such that the first, second, third and fourth cap ports are separated by 90 degree angles, as seen in FIG. 9E. It should be understood that each of the cap ports 915c may be configured to engage with a corresponding eye bolt, such as eye bolt 108 of FIG. 1, to allow for easy manipulation of the safe service fitting, while preventing leakage through each cap port 915c.

A bleed off port 925 may also be nested within the radial center 915h of the cap body 915a. A bleed off screw, such as bleed off screw 1250 of FIG. 12, may be configured to selectively engage and nest within the bleed off port 925 in order to allow a user to inspect the fitting cavity, such as fitting cavity 1232 of FIG. 12, without removing top hat from the base. The bleed off port 925 may also be used to bleed off any additional pressure that may have built up within the fitting cavity, upon removal of the engaged bleed off screw, to ensure that the top cap may be removed safely from the base as needed. The bleed off port 925 and the bleed off screw will be discussed in greater detail hereinbelow.

Figure 10A:
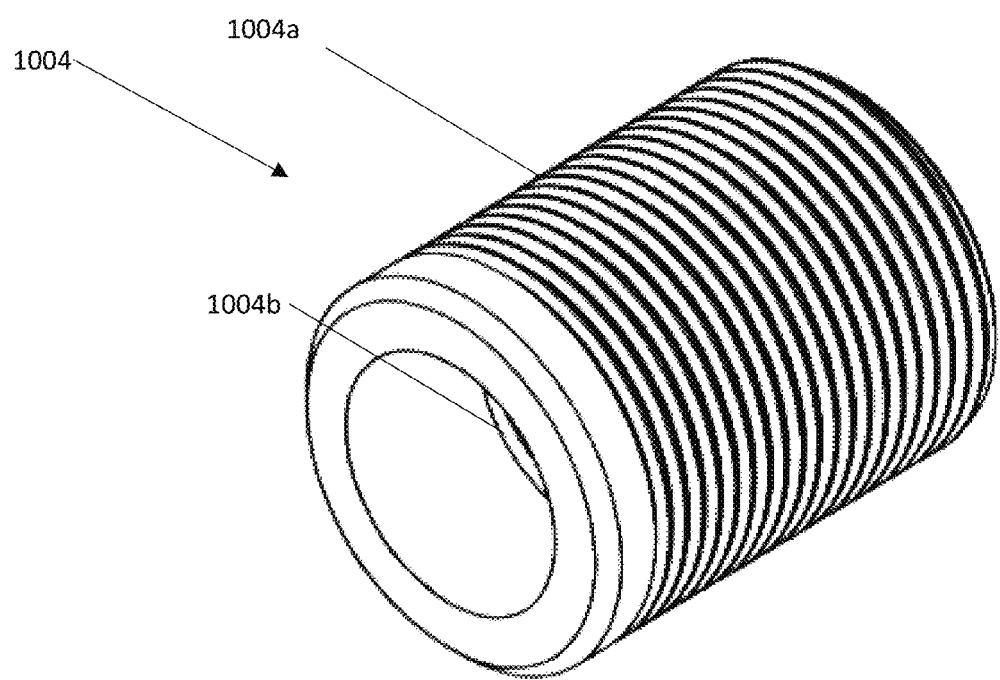
FIG. 10A illustrates the top perspective view of an embodiment of a threaded nipple, according to an aspect.
Figure 10B:
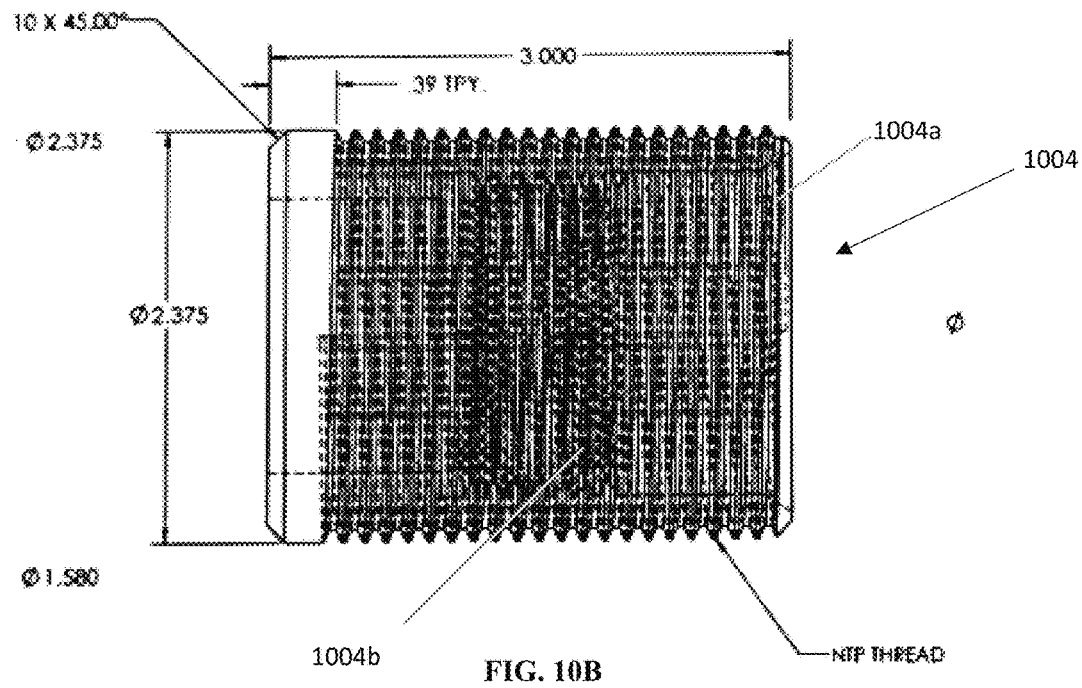
FIG. 10B illustrates the side semi-transparent view of an embodiment of a threaded nipple, according to an aspect.
Figure 10C:
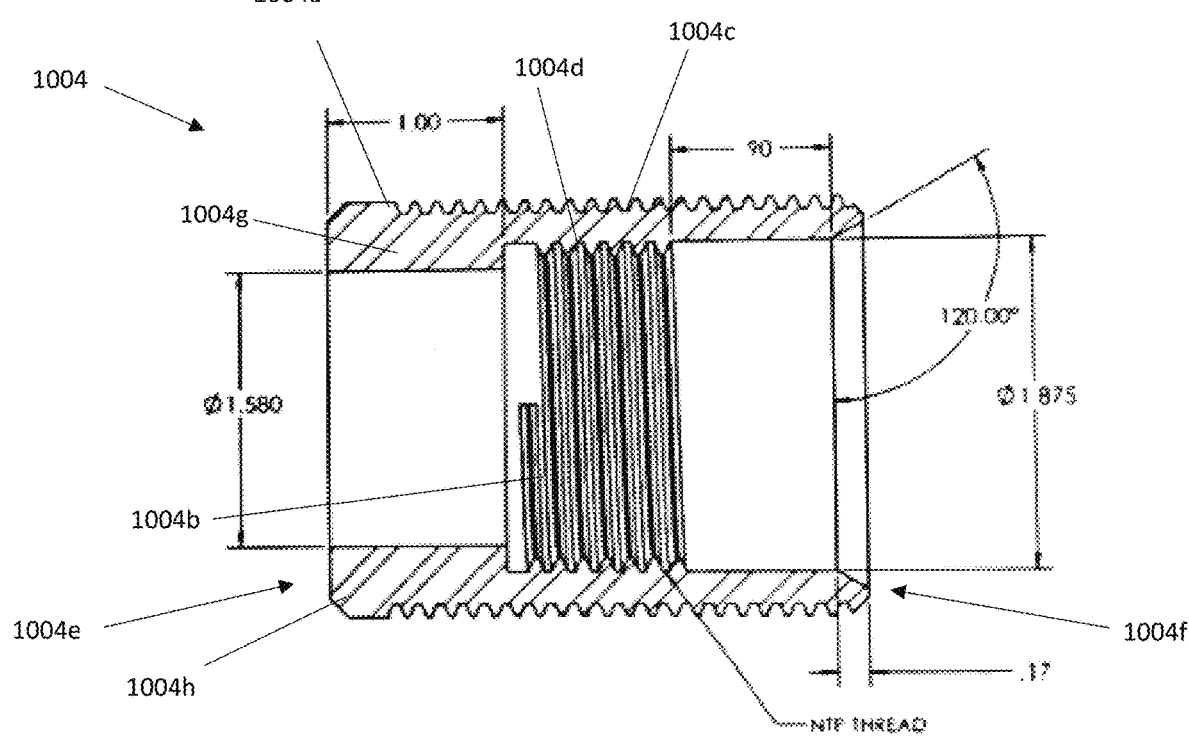
FIG. 10C illustrates the side cross-sectional view of an embodiment of a threaded nipple, according to an aspect.

FIG. 10A illustrates the top perspective view of an embodiment of a threaded nipple 1004, according to an aspect. FIG. 10B illustrates the side semi-transparent view of an embodiment of a threaded nipple 1004, according to an aspect. FIG. 10C illustrates the side cross-sectional view of an embodiment of a threaded nipple 1004, according to an aspect. In order to facilitate attachment of the safe service fitting to elements of a pipe control system or a pipe flow controller, such as the disclosed ball valve 105 of FIG. 1A-1B, it may be necessary to implement a suitable service tap into the base of the safe service fitting disclosed hereinabove. This service tap may be provided in the form of a threaded nipple 1004 having an outer threaded shell 1004a and an inner threaded fitting 1004b nested within the outer threaded shell 1004a. Both the threaded inner shell 1004b and the threaded outer shell 1004a may be configured to engage with a corresponding flow controller to facilitate an airtight connection between the threaded nipple 1004 and the flow controller. The threaded nipple 1004 disclosed herein may be used as a type of service tap configured to facilitate secure engagement between a ball valve and pipe, such that the ball valve is in fluid communication with the internal volume of the pipe.

The threaded nipple 1004 may be suitably configured to facilitate engagement between the base and a ball valve, as well as other applicable structure of a pipe control system. As can be seen in FIG. 10A-10C, the outer threaded shell 1004a may have an outward facing threading 1004c configured to engage with an applicable pipe flow controller, such as a ball valve, and an inward facing threading 1004d configured to engage with the inner threaded fitting 1004b. The outer threaded shell 1004a may also be comprised of a threaded bottom end 1004f configured to be inserted into the base hole, such as base hole 310c of FIG. 3A. In an embodiment, the base hole of the base may be threaded to engage securely with the threaded bottom end 1004f of the threaded nipple 1004, wherein said threaded nipple 1004 may also be welded to the base to further improve engagement. The outer thread shell 1004a may be further comprised of a top end 1004e having an unthreaded tip 1004h configured to be inserted into and engaged with the ball valve or other applicable structure and narrow inner diameter 1004g, such that the threaded shell is inserted deep enough into the ball valve to still have the outward facing threading 1004c engage with the ball valve. The top end 1004e of the outer thread shell 1004a may be configured to have a narrower inner diameter than the threaded bottom end 1004f of the outer threaded shell 1004a in order to ensure a snug fitting of the threaded nipple with the ball valve or other applicable engagement structure. In an embodiment, the inner diameter of the threaded bottom end 1004f may be about 1.875 inches, whereas the inner diameter of the top end 1004e may be about 1.580 inches.

The inner threaded fitting 1004b may be configured to engage with the inward facing threading 1004d of the outer threaded shell in order to suitably secure the inner threaded fitting 1004b within the outer threaded shell 1004a. The inner threaded fitting 1004b may be configured to further engage with the ball valve, such that an airtight seal is formed between the threaded nipple 1004 and the ball valve, thus preventing potential leakage between said elements. It should be understood that an O-ring, such as tap O-ring 1827 of FIG. 8A may also be utilized to further secure the seal between the threaded nipple 1004 and a ball valve, as will be discussed in greater detail hereinbelow.

Figure 11A:
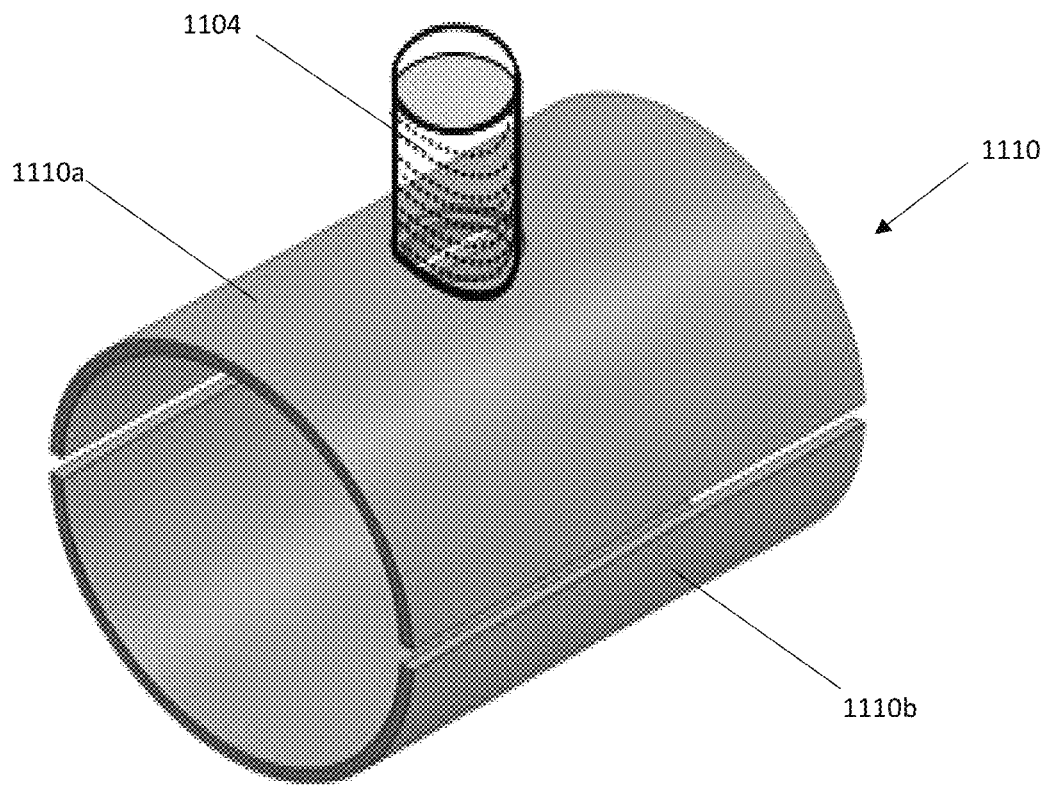
FIG. 11A illustrates the top perspective view of an embodiment of a threaded nipple engaged with the base hole of a mounting seat, according to an aspect.
Figure 11B:
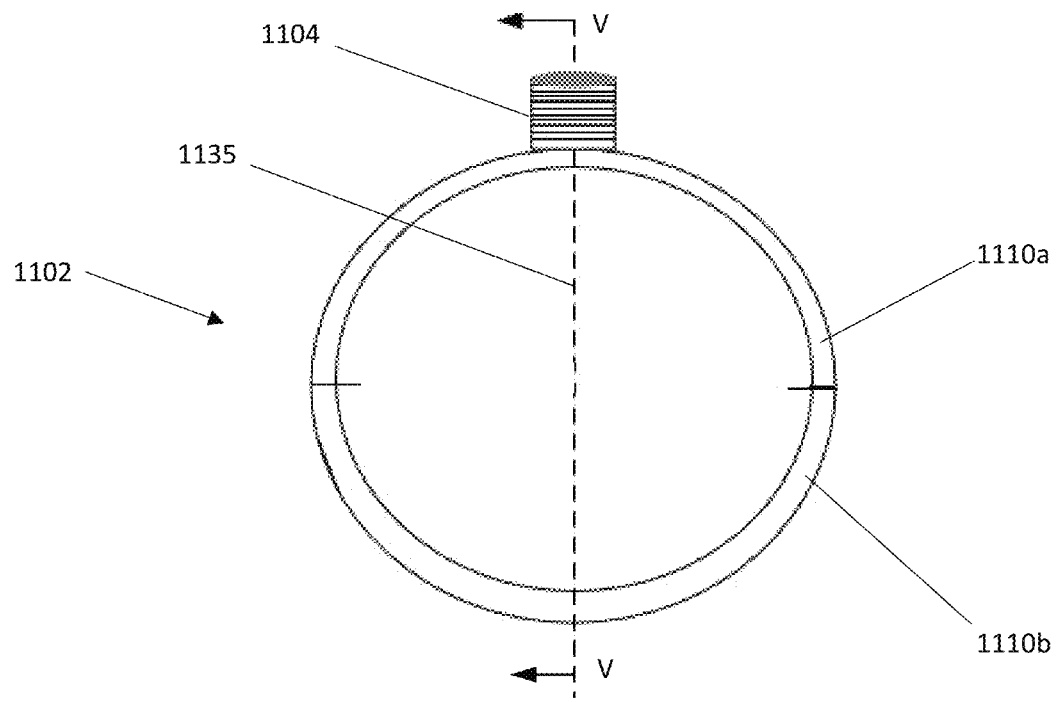
FIG. 11B illustrates the side elevation view of an embodiment of a threaded nipple engaged with the base hole of a mounting seat having reference plane V-V, according to an aspect.
Figure 11C:
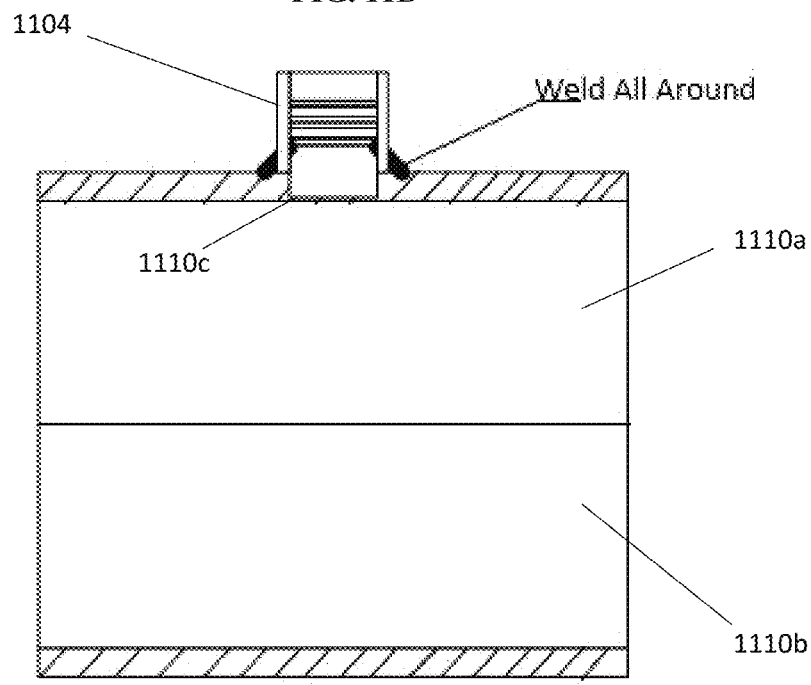
FIG. 11C illustrates the front cross-sectional view of an embodiment of a threaded nipple engaged with the base hole of a mounting seat along reference plane V-V, according to an aspect.

FIG. 11A illustrates the top perspective view of an embodiment of a threaded nipple 1104 engaged with the base hole 1110c of a mounting seat 1110, according to an aspect. FIG. 11B illustrates the side elevation view of an embodiment of a threaded nipple engaged with the base hole 1110c of a mounting seat having reference plane V-V 1135, according to an aspect. FIG. 11C illustrates the front cross-sectional view of an embodiment of a threaded nipple engaged with the base hole 1110c of a mounting seat along reference plane V-V 1135, according to an aspect. As described hereinabove, the threaded nipple 1104 may be configured to engage with the mounting seat 1110 in order to facilitate a secure connection between a pipe control fitting, such as ball valve 105 of FIG. 1A, and an attached pipe secured to the base. The threaded nipple 1104 may be configured to engage with an upper mounting seat section 1110a through insertion and subsequent engagement with the prior disclosed base hole 1110c, as disclosed hereinabove. In order to facilitate a secure engagement of the threaded nipple 1104 within the base hole 1110c of the mounting seat 1100, the threaded nipple 1104 may be suitably welded to the upper mounting seat section 1110a, as seen in FIG. 11C.

The prior disclosed base ring and base flange, such as base ring 211 and base flange 212 of FIG. 2A, may be configured to engage with the upper mounting seat section 1110a such that they surround (or are otherwise disposed around the perimeter of) the threaded nipple 1104, thus providing a protective barrier around the threaded nipple 1104. When base flange engages with the top hat flange of a top hat, complete coverage of the internal pipe flow elements, including the pipe flow controller, may be achieved, thus protecting said internal pipe flow controller from corrosion and impacts. It should be understood that the flanges (the base flange and top hat flange) may be provided with a sufficiently large diameter to form a suitably large protective barrier around the structures enclosed within the safe service fitting. While the upper mounting seat section 1110a and the lower mounting seat section 1110b may appear to be in contact in FIG. 11B-11C, it should be understood that these two sections of the mounting seat 1110 may be separated by a fixed distance upon engagement with a corresponding pipe, depending on the mechanism of attachment that is implemented and the size of the pipe.

FIG. 12 illustrates the side cross-sectional view of an embodiment of a safe service 1201 fitting engaged with a pipe 1224, according to an aspect. As disclosed hereinabove, the safe service fitting 1201 may be configured to engage with a pipe 1224 such that an internally disposed pipe flow controller, such as a ball valve 1205, is protected from impacts and corrosion. It should be understood that the plurality of internally disposed pipe elements ("pipe flow controller elements", "pipe control elements") may include any of the structures enclosed within the safe service fitting upon installation, including but not limited to the threaded nipple 1204, the ball valve 1205 and the bull plug 1206.

As disclosed hereinabove, the overall structure of the safe service fitting 1201 may be comprised of a base 1202 configured to engage directly with a pipe 1224 through welding or other suitable attachment means, and a top hat 1203 configured to engage with the base 1202 to enclose a plurality of internally disposed pipe elements. The base 1202 may be comprised of a mounting seat 1210 having upper and lower mounting seat sections 1210*a*, 1210*b* configured to engage with the pipe 1224 to secure the safe service fitting to said pipe 1224. The base 1202 may be further comprised of a base ring 1211 configured to engage with mounting seat 1210 and a base flange 1212 configured to engage with the base ring 1211. The top hat 1203 may be comprised of a top hat flange 1213 and a top hat ring 1214 configured to engage with a the top hat flange 1213. The top hat flange 1213 may be configured to coaxially align and engage with the base flange 1212 such that the base ring 1211 is coaxially aligned with the top hat ring 1214. The top hat 1203 may be further comprised of a top cap 1215 configured to engage with the top hat ring 1214 to form a fitting cavity 1232 within which the plurality of internally disposed pipe flow controller elements is concealed and protected. As can be seen in the pipe fitting 1201 embodiment of FIG. 12, the base hole 1210*c*, base ring 1211, base flange 1212, top hat flange 1213, top hat ring 1214, top cap 1215 and threaded nipple 1204 may be all coaxially aligned on a central pipe fitting axis 1201*a*.

As can be seen in FIG. 12, the plurality of internally disposed pipe flow controller elements, including the ball valve 1205, may be arranged in such a way to allow suitable control operations upon being manipulated by a user. The threaded nipple 1204 may be engaged with the mounting seat 1210 as disclosed hereinabove to provide an attachment point for the connection of the pipe flow controller (e.g., the ball valve 1205) to the pipe 1224. The threaded nipple 1204 may be configured to engage with the ball valve 1205, such that a user may manipulate the ball valve 1205 in order to manipulate flow through the pipe 1224. A threaded nipple housing 1227 may be secured to and surround the threaded nipple 1204 in order to improve the engagement between the threaded nipple 1204 and ball valve 1205. It should be understood that the threaded nipple housing 1227 may not be implemented as shown in FIG. 12 in all embodiments, as the engagement between the threaded nipple 1204 and the ball valve may be made sufficiently secure using just an O-ring and complementary supporting structure, as will be discussed hereinbelow. The ball valve 1205 may be further configured to engage with a bull plug 1206 in order to facilitate suitable capping of the ball valve 1205 and provide leak prevention while the ball valve 1205 is not in use. As such, a threaded nipple 1204 may be engaged with a pipe flow controller (such as the ball valve 1205), the base and the pipe, such that an inner volume of the pipe 1224*b* is in fluid communication with the pipe flow controller 1205.

As disclosed hereinabove, different types of structures may be engaged with the cap ports, such as cap ports 915*c* of FIG. 9A-9B, depending on the overall functions and capabilities desired for the safe service fitting. One such structure is an eye bolt 1208 which may be configured to securely engage with top hat 1203 to allow the safe service fitting 1201, and thus the attached pipe 1224, to be moved and manipulated more easily without directly touching the pipe 1224, top hat 1203 or base 1202. Another such structure that may engage with the top hat is a bleed off screw 1250 configured to be nested within the bleed off port 1225. The bleed off port 1225 may be used as a safety element in certain applications, as manipulation of the bleed off screw 1250 to remove it from the bleed off port 1225 may allow a user to check the fitting cavity 1232 environment enclosed within the safe service fitting 1201 before opening it (e.g., removing the top bolts 1209 to remove the top hat 1203) to determine if oil, gas, etc., is present within. In an embodiment, a ¾ inch diameter bleed off port 1225 may be utilized with a suitably sized bleed off screw 1250 configured to selectively engage with the bleed off port 1225 to seal the fitting cavity 1232. It should be understood that the bleed off screw 1250 may be configured to further engage with the bull plug 1206 while said bleed off screw 1250 is fully nested within the bleed off port 1225, as seen in FIG. 12, in order to prevent the bull plug 1206 from rotating and thus unscrewing from the ball valve 1205 due to pressure, vibrations, etc. that may occur. In an embodiment, the bleed off screw 1250 may be about ½ inch in length to suitably engage with the bull plug 1206 upon being fully nesting within the bleed port 1225.

In a safe service fitting embodiment, such as that of safe service fitting 1201 of FIG. 12, the distance between top surface of the top cap 1215 and a central axis 1224*a* of the pipe 1224 may be about 14.080 inches, wherein the distance between the top surface of the top cap 1215 and the bottom surface of the top hat flange 1213 (e.g., the total height of the top cap 1203) may be about 7.063. The safe service fitting 1201 and its various elements may be appropriately sized in order to provide sufficient protection to the plurality of internally disposed pipe flow controller elements, without significantly contributing to the overall volume of the safe service fitting 1201. However, it should be noted that the radial protrusion of the base flange 1212 and the top hat flange 1213 is intentional, as the providing of sufficiently large flanges 1212, 1213 around the safe service fitting 1201 will allow said flanges 1212, 1213 protect the internally disposed pipe controller elements from being damaged by an impact. In an embodiment, the flanges 1212, 1213 may be configured to deflect impacts away from the internally concealed ball valve 1205, thus preventing damage or destruction of said ball valve 1205.

In an embodiment, each element of the top hat 1203 may be held together by a corresponding weld 1230, wherein welds 1230 are made between the top cap 1215 and the top hat ring 1214, as well as between the top hat ring 1214 and the top hat flange 1213. In the same embodiment, each element of the base may also be held together by a corresponding weld 1230, wherein welds are made between the base flange 1212 and the base ring 1211. While not show, the base ring 1211 may also be welded to the mounting seat 1210. The potential positioning of welds between safe service fitting elements will be described in greater detail hereinbelow.

As can be seen in FIG. 12, the base flange 1212 and the top hat flange 1213 may protrude further out from the central pipe fitting axis 1201*a* than other elements of the pipe fitting 1201, thus creating a protective shield around the more centrally disposed pipe fitting elements and the enclosed flow control elements. One benefit of that is a large protective barrier may be formed around the contents of fitting cavity 1232 (e.g., the ball valve 1205) that may protect them from accidental impacts, without significantly increasing the overall size and volume of the pipe fitting 1201. In an example, an accidental impact in the form of a swinging mechanical arm may be deflected by the base flange 1212 and the top hat flange 1213 before impacting the base ring 1211 or top hat ring 1214. Thus any resultant damage from said accidental impact may be localized to the distal, outer perimeter 1240 of the flanges 1212, 1213, which are disposed a safe distance away from the fitting cavity 1232. This allows for superior protection of the ball valve 1205, when compared to alternative structures lacking a large diameter ring that protrudes well beyond the base ring 1211 and the top hat ring 1214.

As described hereinabove, the outer diameters of the base ring 1211 (first outer diameter), base flange 1212 (second outer diameter), top hat flange 1213 (third outer diameter), top hat ring 1214 (fourth outer diameter), and top cap 1215 (fifth outer diameter) may be configured to provide optimized protection the contents of the fitting cavity 1232. In an embodiment, the second and third outer diameters may be the largest, and equal to each other, thus forming a protective barrier around the pipe fitting 1201. In the same embodiment, the fifth outer diameter may be the second largest, thus allowing blows taken to the top of the pipe fitting to be deflected away from the top hat ring 1214. Finally, the first and fourth outer diameter may be less than the second and third outer diameters, as well as less than the fifth outer diameter, thus protecting the base ring 1211 and the top hat ring 1214 from potential impact by virtue of the larger diameter flanges 1212, 1213 and top cap 1215 providing blocking structures around said rings 1211, 1214.

Figure 13A:
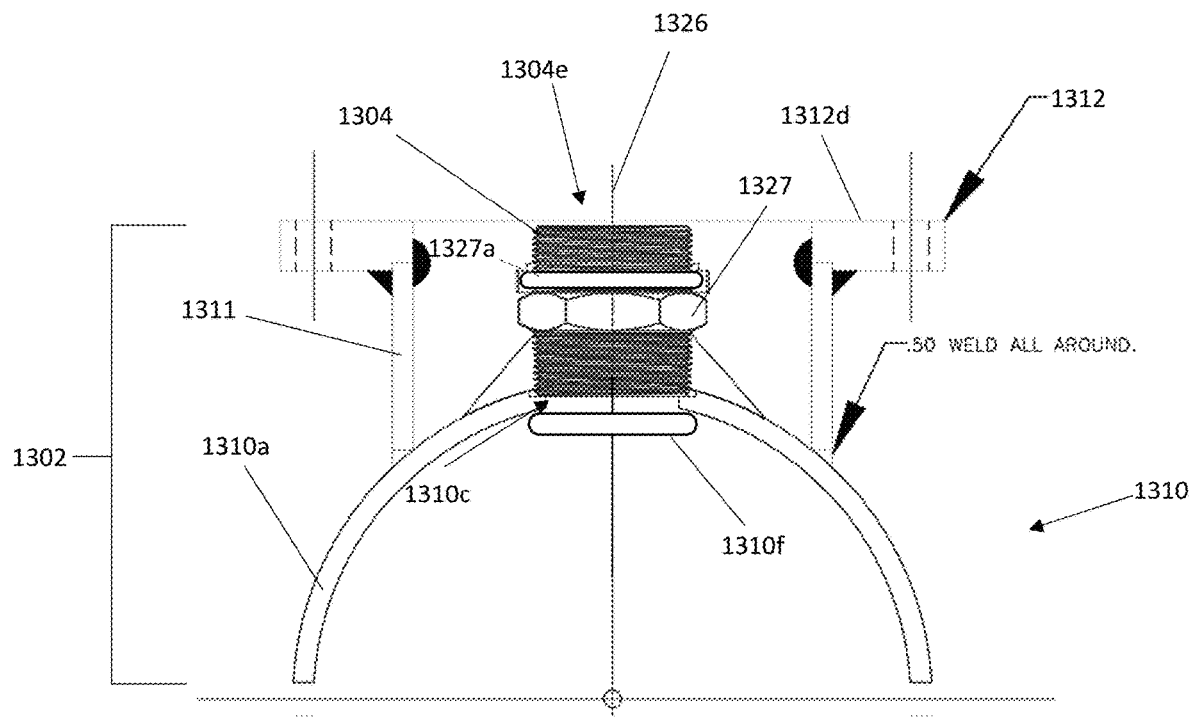
FIG. 13A illustrates the side cross-sectional view of an embodiment of a base, according to an aspect.
Figure 13B:
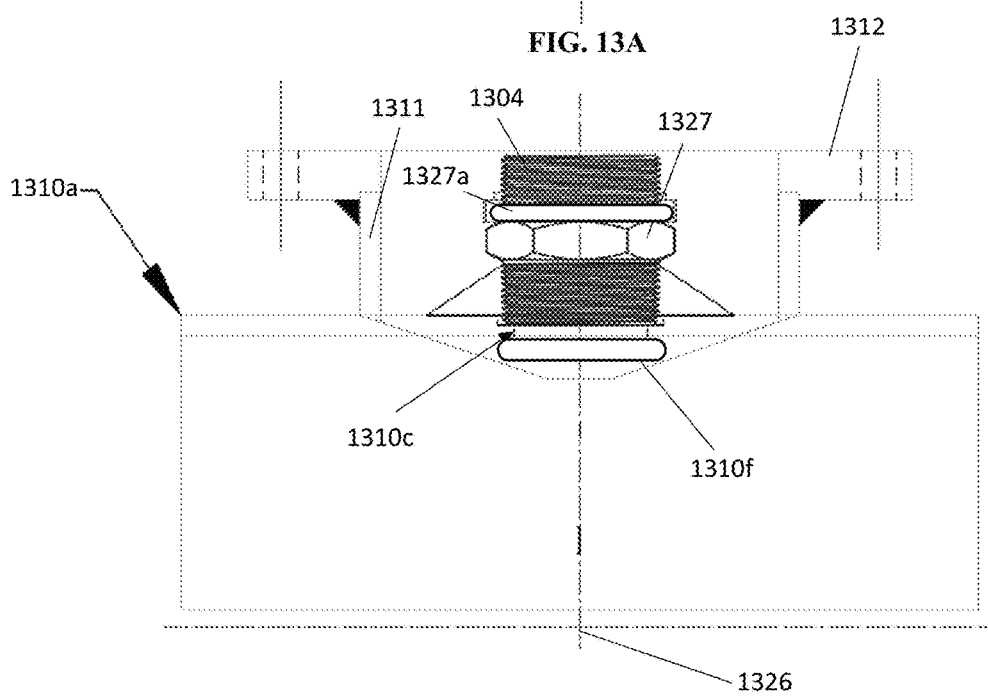
FIG. 13B illustrates the front cross-sectional view of an embodiment of a base, according to an aspect.

FIG. 13A illustrates the side cross-sectional view of an embodiment of a base, according to an aspect. FIG. 13B illustrates the front cross-sectional view of an embodiment of a base, according to an aspect. As discussed hereinabove, the base 1302 of a safe service fitting may be configured to engage directly with a pipe through engagement of a mounting seat 1310 with said pipe. An upper mounting seat section 1310a may be configured to engage with both the 1304 threaded nipple and the base ring 1311 via welding, as shown in FIG. 13A-13B, or any other suitable method of secure attachment. In an embodiment, the top end 1304e of the threaded nipple 1304 and the top surface of the 1312d of the base flange 1312 may be nearly the same height, such that their upper surfaces are nearly flush with each other. In an embodiment, the base hole 1310c, base ring 1311, base flange 1312 and the threaded nipple 1304 may be coaxially aligned with each other, such that these elements are all coaxially aligned on a service fitting axis 1326.

As disclosed hereinabove, a threaded nipple housing 1327 secured to the threaded nipple 1304 may allow for easy manipulation of the threaded nipple 1304 and ensure proper positioning of elements engaged with the threaded nipple 1304, such as the ball valve. The threaded nipple housing 1327 may also include an O-ring gasket, such as tap O-ring gasket 1327a, configured to prevent potential leakage between the threaded nipple 1304 and the ball valve 1305. Additionally, as described hereinabove, for pipes carrying less reactive materials, such as water, an additional gasket, in the form of a base gasket 1310f, may be disposed between the base hole 1310c and an attached pipe to further facilitate an airtight engagement between the threaded nipple 1304 and the pipe. While the use of a base gasket 1310f may be described for usage in safe service fitting embodiments that employ base screws to engage with a pipe, it should be understood that this base gasket 1310f may also be implemented in other safe service fitting embodiments as desired and/or necessary to establish an airtight seal, regardless of the pipe engagement method. It should also be understood that embodiments of the safe service fitting may utilize welding to secure the base 1302 to the pipe to establish an airtight seal between the base 1302 and the pipe, or more specifically between the threaded nipple 1304 and pipe to prevent leakage between the base and pipe.

Figure 14:
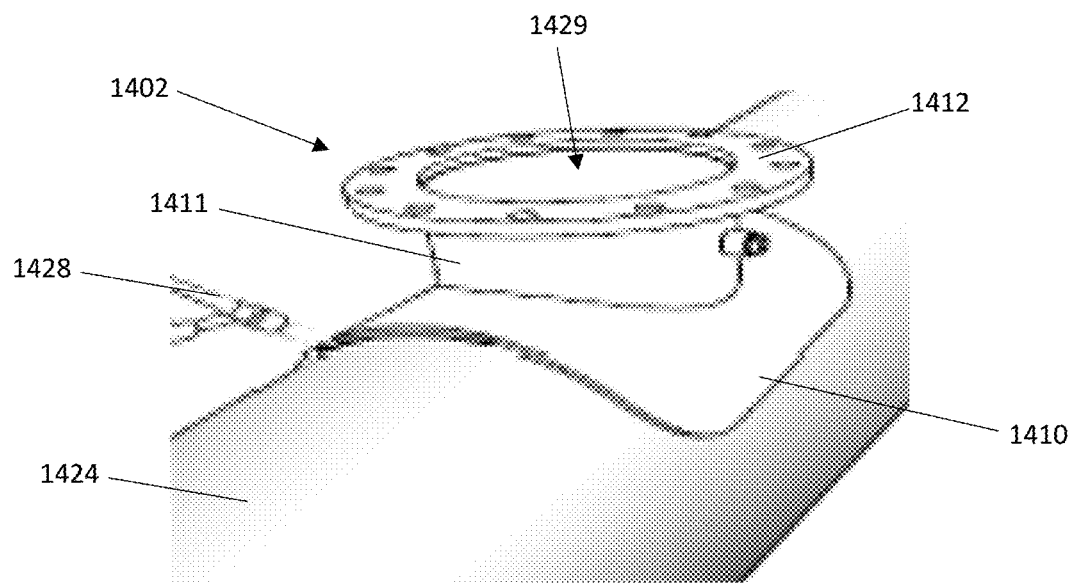
FIG. 14 illustrates the process of a base being welded onto a pipe, according to an aspect

FIG. 14-17 illustrate the process that may be followed in order to install a safe service fitting on a pipe, according to several aspects. FIG. 14 illustrates the process of a base 1402 being welded onto a pipe 1424, according to an aspect. As disclosed hereinabove, a base 1402 may be securely engaged with a pipe 1424 through suitable engagement means, such as the disclosed base bolts 107 of FIG. 1A-1B, or welding, as shown in FIG. 14. The process of welding the base 1402 to the pipe may include three steps to be followed sequentially. First, an installer may clean the pipe surface at the location that the base 1402 is to be welded to the pipe, removing all loose scale, rust, paint, or other contaminants from the weld area. Next, an installer may place a fillet weld around the body of the base 1402 using a welding tool 1428 to secure it to the pipe 1424. This weld may be equal in leg length to the thickness of the pipe 1424 or the upper mounting seat body 1410a, whichever is less. In an embodiment, the installer may fillet weld leg lengths equal to thickness of pipe 1424 or upper mounting seat body 1410a, whichever is less. Finally, after NDT inspection and pressure testing of the base 1402 is complete, the installer may proceed with the tapping operation, wherein a pipe port (not shown) may be drilled into the pipe 1424 such that the pipe port aligns coaxially with the base hole, such as base hole 310c of FIG. 3A. While not visible in FIG. 14, it should be understood that the threaded nipple, such as threaded nipple 1304 of FIG. 13A, may already be attached to the base 1402, to ensure proper coaxial alignment of the base hole, threaded nipple, and the hole that is tapped into the pipe during tapping.

As can be seen in FIG. 14, the base 1402 may be secured to the pipe 1424 via welding, without ever having to weld too close to the service area 1429 (e.g., the inner portion of the base surrounded by the base ring 1411) of the base 1402. The mounting seat 1410 may be made sufficiently large that the welding tool 1428 do not need to come into close proximity to the service area, thus preventing possible damage, egging, etc. to the said service area. Furthermore, the structure of the base, particularly the shape/size of the base ring 1411 and base flange 1412 may form a protective shield around the service area 1429, blocking sparks and other hazards from entering the service area 1429. As such, the threaded nipple and other internally disposed safe service fitting elements may be protected from sparks and other hazards which may occur while welding, as well as other hazards during and after installation. Once the base 1402 is welded to the pipe, the installer may proceed with tapping operations to continue installation.

Figure 15:
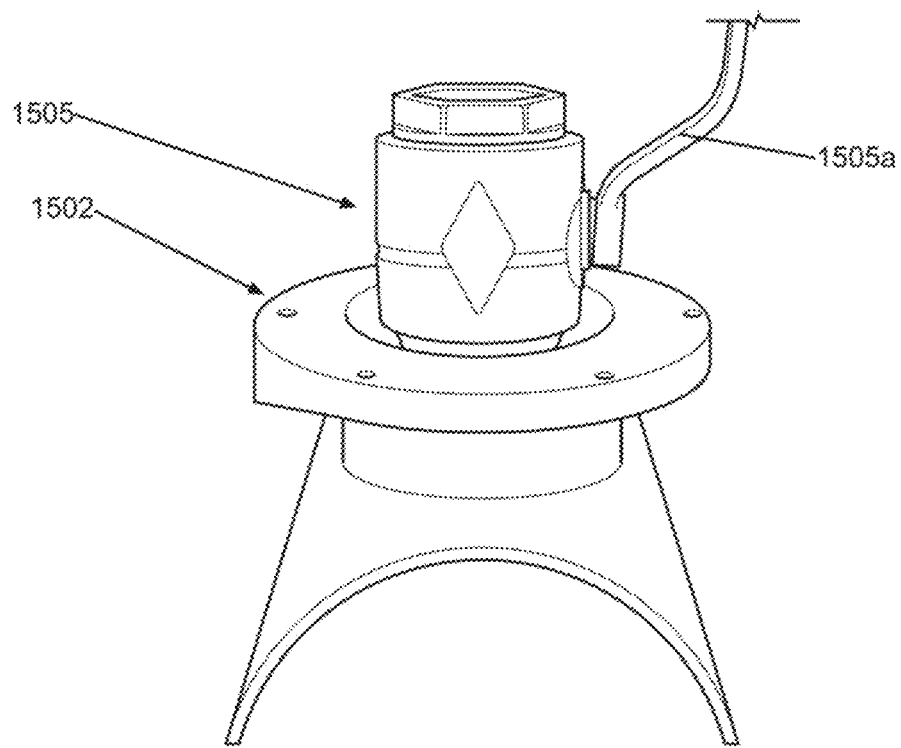
FIG. 15 illustrates a full port ball valve engaged with a base, according to an aspect.

FIG. 15 illustrates a ball valve 1505 engaged with a base 1502, according to an aspect. Once the base 1502 has been installed on a pipe through welding, base bolts, etc., with the threaded nipple (not shown) engaged with the base 1502, a ball valve 1505 may be engaged with the base through direct engagement with the threaded nipple. With this ball valve 1505 installed, fluid flow through the attached pipe may be controlled accordingly through selective manipulation of a valve handle 1505a, wherein said valve handle is configured to be reversibly secured to said ball valve 1505. The installer may also choose to add additional equipment on top of the ball valve, such as pumps, lines and other structures to achieve the desired function of the fitting.

Figure 16:
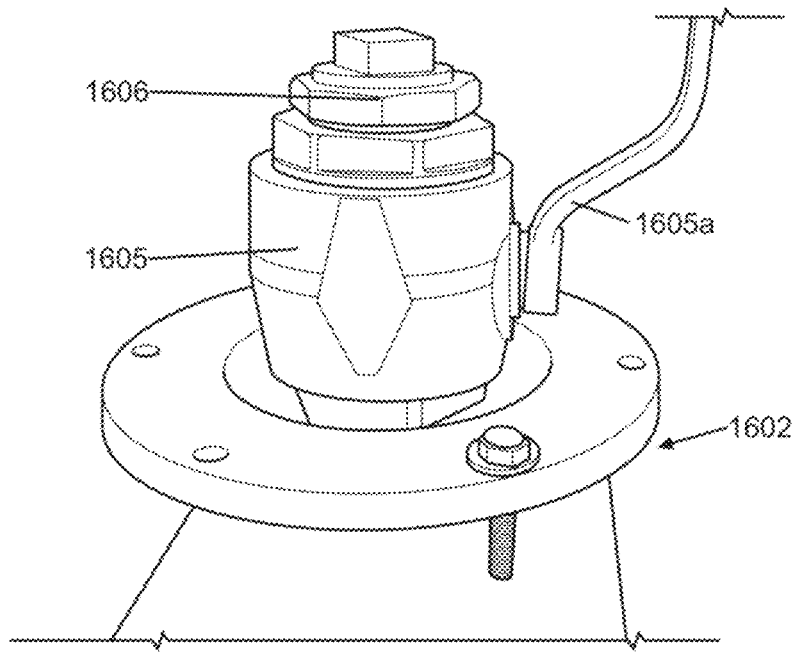
FIG. 16 illustrates a bull-plug installed onto the top of the full port ball valve, according to an aspect.

FIG. 16 illustrates a bull-plug 1606 installed onto the top of the ball valve 1605, according to an aspect. With the ball valve 1605 secured to the pipe and all necessary peripheral structures (pumps, lines, etc.) being attached/detached accordingly, the installer may cap off the ball valve 1605 with a bull plug 1606 to complete installation. With the bull plug 1606 installed, the internally disposed pipe flow controller elements (ball valve 1605, bull plug 1606, and any other structures configured to be enclosed within the safe service fitting) may be ready to be covered.

Figure 17:
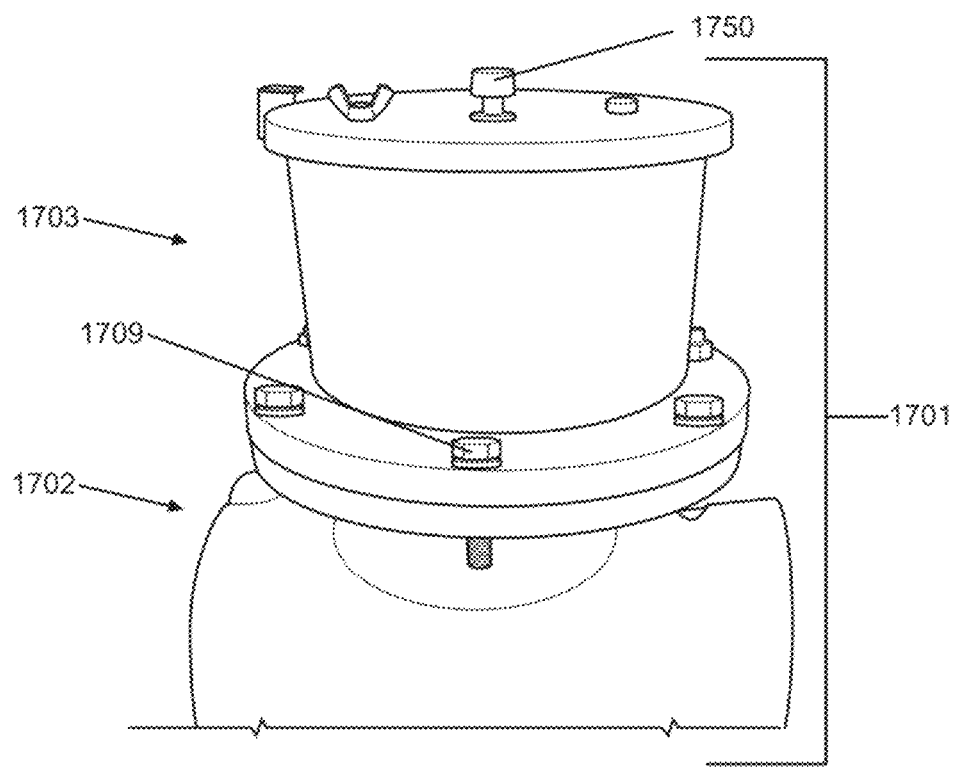
FIG. 17 illustrates a base engaged with a top hat, and thus a completed, sealed safe service fitting, according to an aspect

FIG. 17 illustrates a base engaged with a top hat, and thus a completed, sealed safe service fitting, according to an aspect. With the ball valve, bull plug and all other relevant elements installed on the base, the final step of installing the top hat 1703 over the top of these elements may be performed by placing the top hat 1703 over the base 1702, suitably aligning their respective bolt holes and threading top hat bolts 1709 through corresponding pairs of bolt holes (such as a first bolt hole 512$c$-1 on the base flange 512 of FIG. 5C and a first bolt hole 713$d$-1 on the top hat flange 713 of FIG. 7C), as disclosed hereinabove. It should be understood that certain structures, such as the valve handle 1605$a$ of FIG. 16, may be removed from the ball valve such that the top hat 1703 may cover all of the internally disposed pipe flow controller elements without becoming unnecessarily cumbersome. With the disclosed safe service fitting fully installed, the pipe may be moved and positioned as needed (either above or below ground) without the internally disposed pipe flow controller becoming damaged or dirtied. If the installer or another user needs to access the ball valve again at some point, the installer/user may manipulate the bleed off screw 1750 on the top hat 1703 to bleed off any built-up pressure and determine if/when it is safe to remove the top hat 1703 to regain access to the ball port.

The overall process of installing a safe service fitting on a pipe may entail the fitting of the base with a service tap to the pipe, the securing of a ball valve to the base, the engagement of any necessary auxiliary structures to the ball valve, followed by the installation of a bull plug to the ball valve and finally engagement of the top hat 1703 with the base 1702 to seal the safe service fitting 1701. As such the method of installing a pipe fitting on a pipe may be comprised of the steps of: engaging a base of the pipe fitting with the pipe, tapping the pipe by drilling a pipe port into the pipe, such that threaded nipple on attached to the base is in fluid communication with an internal volume of the pipe; engaging a pipe flow controller with the threaded nipple; engaging a bull plug with the pipe flow controller; and engaging a top hat with the base in order to form a fitting cavity around the pipe flow controller. This process may be done reversibly, such that the ball valve may be accessed as needed through removal of the top hat bolts 1709 and subsequent manipulation of the ball valve.

Figure 18A:
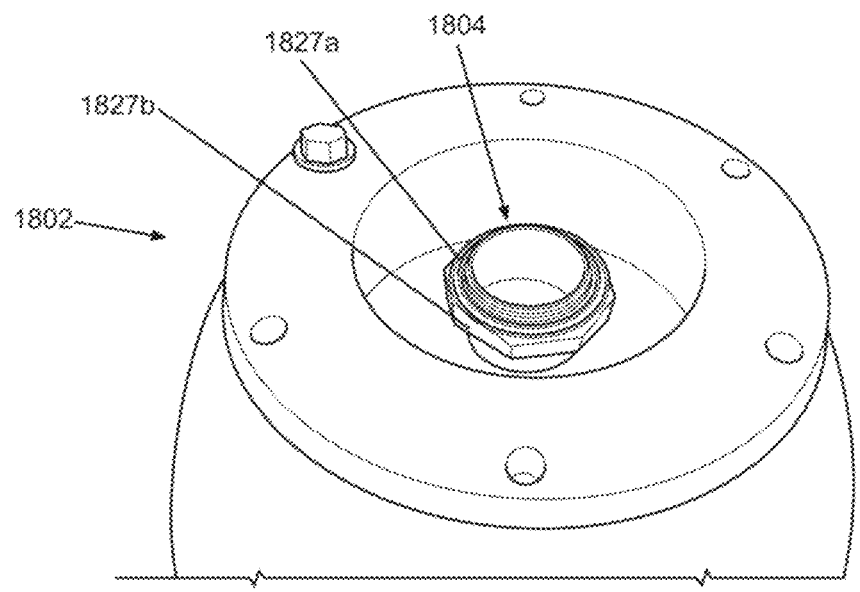
FIG. 18A illustrates a base engaged with a threaded nipple having a threaded nipple housing, according to an aspect.
Figure 18B:
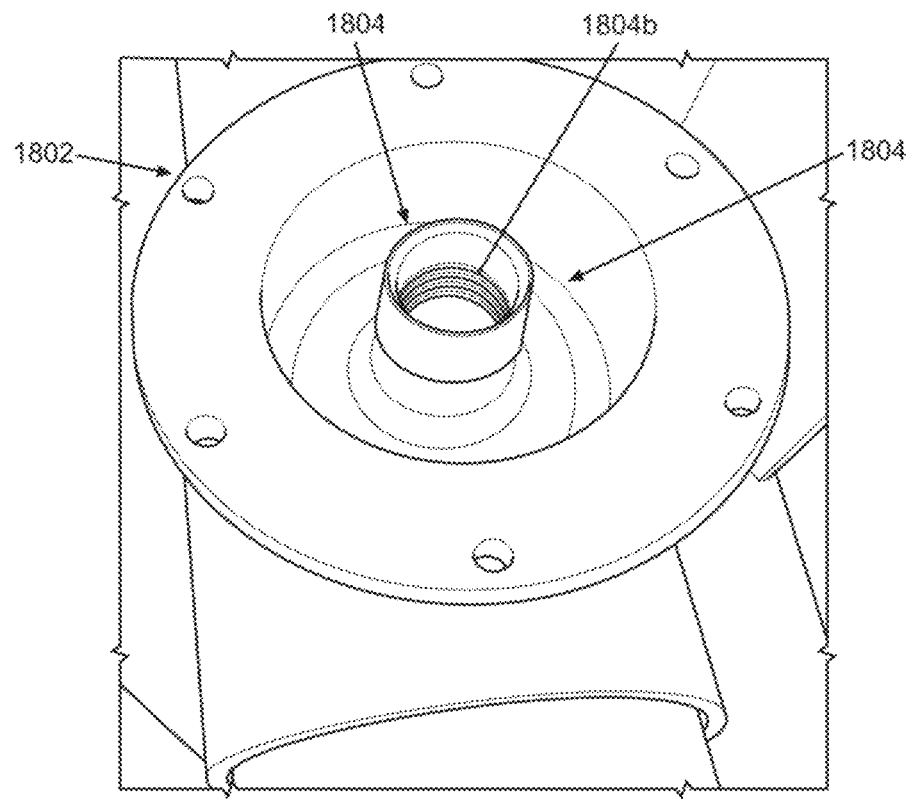
FIG. 18B illustrates a base engaged with a threaded nipple, according to an aspect.

FIG. 18A illustrates a base 1802 engaged with a threaded nipple 1804 having a threaded nipple housing 1827, according to an aspect. FIG. 18B illustrates a base 1802 engaged with a threaded nipple 1804, according to an aspect. As disclosed hereinabove, certain embodiments of the safe service fitting may employ the usage of a threaded nipple housing 1827 configured to surround the threaded nipple 1804. This threaded nipple housing 1827 may be configured to improve engagement between the threaded nipple 1804 and an attached ball valve or other attached structure. The threaded nipple housing 1827 may facilitate this improved engagement by providing a tap O-ring gasket 1827$a$ between a gasket seat 1827$b$ on the threaded nipple housing 1827 and the installed ball valve. The gasket seat 1827$b$ may be configured to engage with the threaded nipple 1804 to provide a mounting position for the tap O-ring gasket 1827$a$. Upon engagement between the threaded nipple 1804 and the ball valve, the tap O-ring gasket 1827$a$ may be compressed between the gasket seat 1827$b$ and the ball valve, thus creating an improved seal, when compared to embodiments lacking the threaded nipple housing 1827 and corresponding tap O-ring 1827$a$. The inclusion of the threaded nipple housing 1827 within the structure of the safe service fitting may not be necessary in all applications, especially when the engagement between the threaded nipple 1804 and the ball valve is already sufficient to prevent any potential leaks. It should be understood that a tap O-ring gasket 1827$a$ may be incorporated between the threaded nipple 1804 and the ball valve through any suitable means that ensures an airtight seal between the two elements.

It should be understood that the threaded nipple 1804 and the threaded nipple housing 1827 may be suitably configured for direct or indirect engagement with a multitude of different structures, depending on the needs of the application. In an embodiment, such as the threaded nipple embodiment of FIG. 18B, the threaded nipple 1804 may be configured for direct engagement with a completion plug (not shown) to help seal the safe service fitting when not in use and prevent leakage through the threaded nipple 1804. The completion plug may be configured to engage with the internal threaded fitting 1804$b$ of the threaded nipple 1804 to establish this seal. In an alternative embodiment, a completion plug may be configured to engage with a ball valve, such as ball valve 1605 of FIG. 16, such that the completion plug is indirectly engaged with the threaded nipple 1804. The threaded nipple 1804, threaded nipple housing 1827, as well as the safe service fitting overall, may be configured to engage with a plurality of different elements interchangeably, in order to facilitate a wide array of device functionalities depending on the use case for the safe service fitting.

Figure 19:
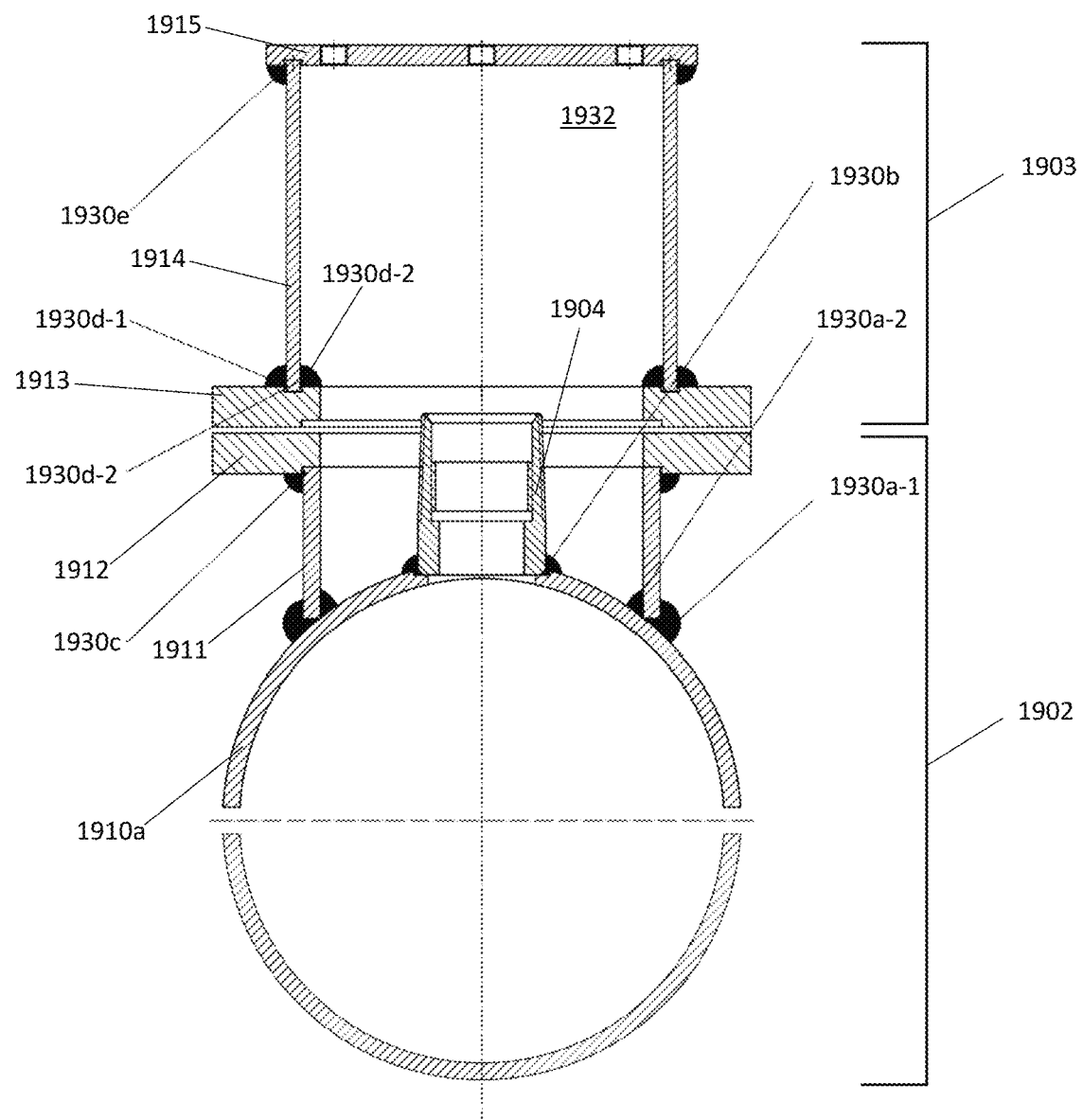
FIG. 19 illustrates a side cross-sectional view of a weld map for an embodiment of the safe service fitting, according to and aspect.

FIG. 19 illustrates a side cross-sectional view of a weld map for an embodiment of the safe service fitting, according to and aspect. As disclosed hereinabove, welds may be utilized to ensure secure connections between adjacent base 1902 elements, as well as between adjacent top hat 1903 elements, are formed. In an embodiment, starting with the base 1902, the upper mounting seat section 1910$a$ may be secured the base ring 1911 by a first base weld 1930$a$-1 disposed around an outer surface of the base ring 1911 (e.g., not disposed within the fitting cavity 1932) and a second base weld 1930$a$-2 disposed around an inner surface of the base ring 1911 (e.g., within the fitting cavity 1932). In the same embodiment, the upper mounting seat section 1910$a$ may be further secured to the threaded nipple 1904 by a third base weld 1930$b$ disposed around the threaded nipple 1904 within the fitting cavity 1932. Additionally, a fourth base weld 1930$c$ may be disposed around the outer surface of the base ring 1911 outside of the fitting cavity 1932 to secure the base ring 1911 to the base flange 1912.

As disclosed hereinabove, the various elements of the top hat 1903 may also be welded together to ensure their secure interconnection. In an embodiment, the top hat ring 1914 may be secured to the top hat flange 1913 by a first top hat weld 1930$d$-1 disposed around the outer surface of the top hat ring 1914 outside of the fitting cavity 1932 and a second top hat weld 1930$d$-2 disposed around the inner surface of the of the top hat ring 1914 within the fitting cavity 1932. Furthermore, in said embodiment, the top hat ring 1914 may be secured to the top cover 1915 by a third top hat weld 1930*e* disposed around the outer surface of the top hat ring 1914 outside of the fitting cavity 1932. Each weld described herein may be a fillet weld provided as a circular welding. The height of each weld may be approximately 12.7 mm. Each weld may be performed in three passes around the corresponding element(s) so as to ensure a secure engagement between corresponding elements.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

Claim limitations should be construed as means-plus-function limitations only if the claim recites the term "means" in association with a recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. A pipe fitting configured to engage with a pipe having a pipe port, the pipe fitting comprising:
    a base having:
        a mounting seat having a base hole, the mounting seat being configured to engage directly with the pipe such that the base hole is coaxially aligned with the pipe port;
        a base ring configured to engage with the mounting seat; and
        a base flange configured to engage with the base ring, wherein the base flange is comprised of a base ring slot, wherein the base ring is configured to be partially nested within the base ring slot;
    a top hat configured to engage with the base, the top hat having:
        a top cap having a cap ring slot;
        a top hat ring configured to be partially nested within the cap ring slot; and
        a top hat flange having a top flange ring slot, wherein the top hat ring is further configured to be partially nested within the top flange ring slot,
        wherein the top hat flange is configured to be reversibly engaged with the base flange to form a fitting cavity; and
    a threaded nipple configured to be nested within the base hole, wherein the threaded nipple is further configured to engage with a pipe flow controller such that the pipe flow controller is in fluid communication with an inner volume of the pipe and the base flange and top hat flange are configured to protrude outward away from the fitting cavity, such that the base flange and top hat flange are configured to protect structures within the fitting cavity.

2. The pipe fitting of claim 1 further comprising a threaded nipple housing configured to surround the threaded nipple, the threaded nipple housing comprising a gasket seat configured to engage with the threaded nipple, and a tap O-ring gasket configured to be seated within the gasket seat, wherein the threaded nipple housing is configured to prevent leaks between the threaded nipple and the flow controller.

3. The pipe fitting of claim 1, wherein the pipe port, base hole, base ring, base flange, top hat flange, top hat ring, top cap and threaded nipple are coaxially aligned.

4. The pipe fitting of claim 1, wherein the pipe flow controller is comprised of a full port ball valve.

5. The pipe fitting of claim 1, wherein the mounting seat is comprised of an upper mounting seat section and lower mounting seat section, wherein the mounting seat is configured to engage with the pipe through the utilization of base screws configured to engage the upper mounting seat section with the lower mounting seat section to clamp the upper mounting seat section and lower mounting seat section together around the pipe.

6. The pipe fitting of claim 1, wherein the mounting seat is configured to be engaged with the pipe through welding.

7. The pipe fitting of claim 1, wherein the top hat is configured to engage with the base through the use of a plurality of top hat screws, wherein each top hat screw of the plurality of top hat screws is configured to be nested within a corresponding bolt hole nested within top hat flange and a corresponding bolt hole nested within the base flange.

8. The pipe fitting of claim 1 further comprising a bleed off port nested within the top cap, and a bleed off screw configured to be selectively nested within the bleed off port.

9. The pipe fitting of claim 1, wherein the engagement between the base and the top hat is configured to prevent dirt and chemicals from entering the fitting cavity.

10. The pipe fitting of claim 1, wherein the pipe fitting is comprised of carbon steel.

11. A pipe fitting configured to engage with a pipe, the pipe fitting comprising:
a base configured to engage with the pipe, the base having:
a mounting seat configured to engage directly with the pipe;
a base ring configured to engage with the mounting seat, the base ring having a first outer diameter;
a base flange configured to engage with the base ring, the base flange having a second outer diameter;
a top hat configured to selectively engage with the base, the top hat having:
a top hat flange configured to engage directly with the base flange, the top hat flange having a third outer diameter;
a top hat ring configured to engage with the top hat flange, the top hat ring having a fourth outer diameter;
a top cap configured to engage with the top hat ring, the top cap having a fifth outer diameter;
a bleed off port nested within the top cap; and
a bleed off screw configured to be selectively nested within the bleed off port;
wherein the second and third outer diameters are each greater than the fifth outer diameter, and the first and fourth outer diameters are each less than the fifth outer diameter and wherein upon engagement of the top hat with the base a fitting cavity is formed;
wherein the pipe fitting is configured to surround and protect the pipe flow controller such that the pipe flow controlled is disposed within the fitting cavity and the pipe flow controller is in fluid communication with an internal volume of the pipe.

12. The pipe fitting of claim 11 wherein the second outer diameter and the third outer diameter are equal.

13. The pipe fitting of claim 11, wherein the second outer diameter and the third outer diameter are both about 10 inches.

14. The pipe fitting of claim 11, wherein the engagement between the base and the top hat is configured to prevent dirt and chemicals from entering the fitting cavity.

15. The pipe fitting of claim 11, wherein the bleed off screw is configured to selectively engage with a bull plug attached to the pipe flow controller, wherein the bleed off screw is configured to selectively prevent rotation of the bull plug.

16. A method of installing a pipe fitting on a pipe comprising the steps of:
engaging a base of the pipe fitting with the pipe, the base comprising:
a mounting seat having a base hole, the mounting seat being configured to engage directly with the pipe;
a base ring configured to engage with the mounting seat;
a base flange configured to engage with the base ring; and
a threaded nipple configured to be seated within the base hole and engaged with
the mounting seat, such that base hole and threaded nipple are coaxially aligned;
tapping the pipe by drilling a pipe port into the pipe, wherein the pipe port is coaxially aligned with the base hole, such that threaded nipple is in fluid communication with an internal volume of the pipe;
engaging a pipe flow controller with the threaded nipple;
engaging a bull plug with the pipe flow controller; and
engaging a top hat with the base in order to form a fitting cavity around the pipe flow controller, the top hat comprising:
a top hat flange configured to engage directly with the base flange;
a top hat ring configured to engage with the top hat flange; and
a top cap configured to engage with the top hat ring.

17. The method of installing a pipe fitting of claim 16, wherein the step of engaging the base with the pipe involves welding the mounting seat of the base to the pipe.

18. The method of installing a pipe fitting of claim 16, wherein the step of engaging the top hat with the base entails the nesting a plurality of top hat bolts within corresponding bolt ports within the top hat and the base, such that each top hat bolt of the plurality of top hat bolts is configured to engage with a corresponding bolt port nested within the top hat flange and a corresponding bolt port nested within the base flange.

19. The method of installing a pipe fitting of claim 16, wherein the step of engaging the top hat with the base prevents dirt and chemicals from entering the fitting cavity.

20. The method of installing a pipe fitting of claim 16, further comprising the step of nesting a bleed off screw into a bleed off port nested within the top cap, such that the bleed off screw is configured to selectively engage with the bull plug and prevent rotation of the bull plug.

* * * * *